US011972379B2

United States Patent
(12) United States Patent
Fujisawa et al.

(10) Patent No.: US 11,972,379 B2
(45) Date of Patent: Apr. 30, 2024

(54) COMPONENT MANUFACTURING SYSTEM AND COMPONENT MANUFACTURING METHOD

(71) Applicant: Yazaki Corporation, Tokyo (JP)

(72) Inventors: Takanori Fujisawa, Makinohara (JP); Tetsuya Onoda, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/393,548

(22) Filed: Aug. 4, 2021

(65) Prior Publication Data

US 2022/0044176 A1 Feb. 10, 2022

(30) Foreign Application Priority Data

Aug. 5, 2020 (JP) ................................ 2020-133333
Nov. 4, 2020 (JP) ................................ 2020-184391

(51) Int. Cl.

*G06Q 10/0631* (2023.01)
*B60R 16/02* (2006.01)
*G06F 30/15* (2020.01)
*G06F 113/16* (2020.01)
*G06Q 10/0639* (2023.01)
*G06Q 10/08* (2024.01)

(Continued)

(52) U.S. Cl.

CPC ... *G06Q 10/06315* (2013.01); *B60R 16/0207* (2013.01); *G06F 30/15* (2020.01); *G06Q 10/06313* (2013.01); *G06Q 10/08* (2013.01); *G06Q 10/101* (2013.01); *G06Q 50/04* (2013.01); *G06F 2113/16* (2020.01); *G06Q 10/06395* (2013.01)

(58) Field of Classification Search

CPC ....... G06Q 10/06315; G06Q 10/06313; G06Q 10/101; G06Q 50/04; G06Q 50/28; G06Q 10/06395; B60R 16/0207; G06F 30/15; G06F 2113/16

USPC ........................................................ 705/7.23

See application file for complete search history.

(56) References Cited

U.S. PATENT DOCUMENTS 4,959,509 A * 9/1990 Takeuchi ............... H02G 3/083 277/606
5,610,454 A * 3/1997 Nishikawa .......... B60R 16/0207 174/72 A (Continued)

FOREIGN PATENT DOCUMENTS

EP 1542106 A1 * 6/2005 ....... G05B 19/41865
EP 1542106 A1 6/2005

(Continued)

*Primary Examiner* — Abdallah A El-Hage Hassan
(74) *Attorney, Agent, or Firm* — Sughrue Mion, PLLC

(57) ABSTRACT

A component manufacturing system includes a main base, a first production base and a second production base. The main base designs a common wire harness and optional wire harnesses. The main base has a first order function of determining the number of common wire harnesses to be produced based on temporary order information and placing an order with the first production base, and a second order function of acquiring order confirmation information from the customer at a timing closer to a delivery date than the temporary order information and placing an order with the second production base for the completed wire harness based on the confirmation information.

6 Claims, 10 Drawing Sheets

(51) Int. Cl.
*G06Q 10/101* (2023.01)
*G06Q 50/04* (2012.01)

(56) References Cited

U.S. PATENT DOCUMENTS

| | | | | |
|---|---|---|---|---|
| 6,511,342 | B1 * | 1/2003 | Hein ...................... | B60K 37/00 439/502 |
| 2002/0052772 | A1 | 5/2002 | Nishimoto et al. | |
| 2014/0118500 | A1 * | 5/2014 | Liu ........................... | G06T 7/80 348/46 |
| 2015/0340132 | A1 | 11/2015 | Kitada et al. | |

FOREIGN PATENT DOCUMENTS

| | | | | |
|---|---|---|---|---|
| JP | 7-175857 | A | | 7/1995 |
| JP | 2002-203158 | A | | 7/2002 |
| JP | 2003002444 | A | * | 1/2003 |
| JP | 2005-352993 | A | | 12/2005 |
| JP | 2014-127431 | A | | 7/2014 |
| JP | 2017-152124 | A | | 8/2017 |
| JP | 2017-152154 | A | | 8/2017 |
| JP | 2017152154 | A | * | 8/2017 |
| JP | 2019091559 | A | * | 6/2019 |

* cited by examiner

CUSTOMER'S ORDER DEPARTMENT
41
CUSTOMER'S DELIVERY LOCATION
42
TEMPORARY ORDER INFORMATION
41a
CONFIRMATION INFORMATION
41b
TRANSPORTATION OF COMPLETED COMPONENT
30a
MAIN BASE OF COMPONENT MANUFACTURER
10
SECOND ORDER INFORMATION
10b
SECOND PRODUCTION BASE (DOMESTIC)
30
100
FIRST ORDER INFORMATION
10a
TRANSPORTATION OF COMMON COMPONENT
20a
FIRST PRODUCTION BASE (OVERSEAS)
20

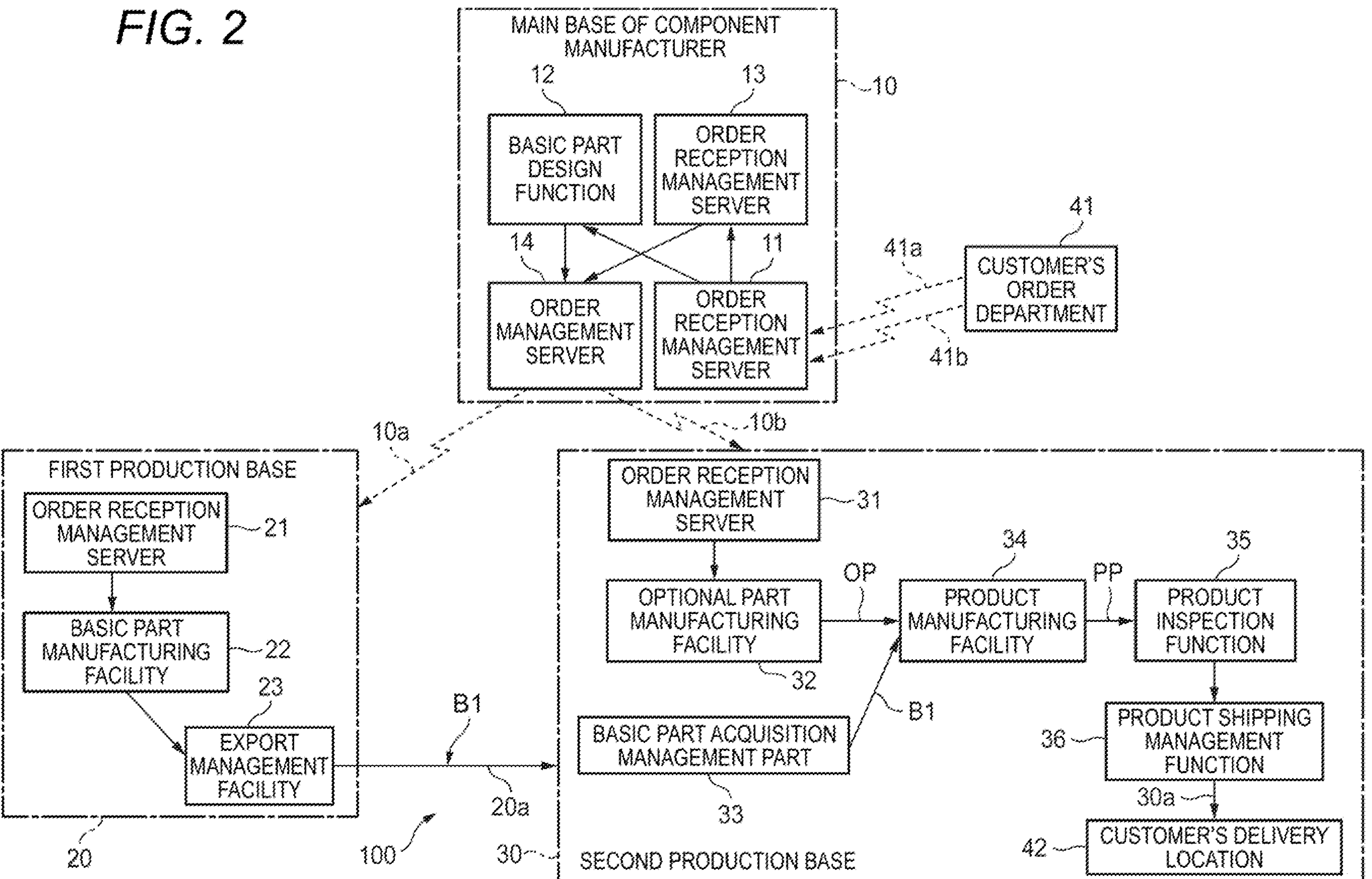
FIG. 2
MAIN BASE OF COMPONENT MANUFACTURER
10
12
BASIC PART DESIGN FUNCTION
13
ORDER RECEPTION MANAGEMENT SERVER
14
ORDER MANAGEMENT SERVER
11
ORDER RECEPTION MANAGEMENT SERVER
41
CUSTOMER'S ORDER DEPARTMENT
41a
41b
10a
10b
FIRST PRODUCTION BASE
ORDER RECEPTION MANAGEMENT SERVER
21
BASIC PART MANUFACTURING FACILITY
22
23
EXPORT MANAGEMENT FACILITY
20
B1
20a
100
ORDER RECEPTION MANAGEMENT SERVER
31
OPTIONAL PART MANUFACTURING FACILITY
32
OP
34
PRODUCT MANUFACTURING FACILITY
PP
35
PRODUCT INSPECTION FUNCTION
BASIC PART ACQUISITION MANAGEMENT PART
33
B1
36
PRODUCT SHIPPING MANAGEMENT FUNCTION
30a
42
CUSTOMER'S DELIVERY LOCATION
30
SECOND PRODUCTION BASE

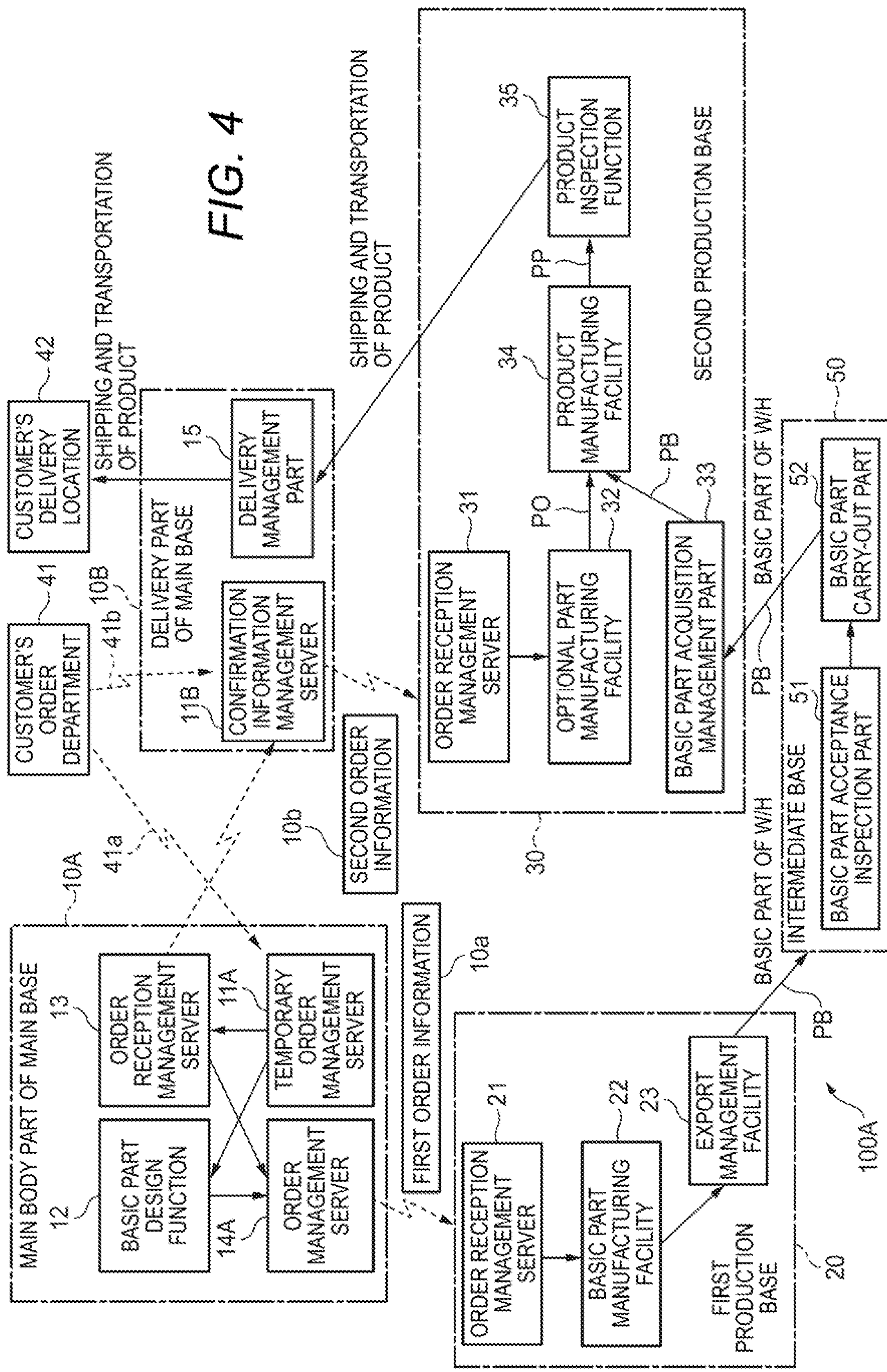
FIG. 4
MAIN BODY PART OF MAIN BASE
10A
12
BASIC PART DESIGN FUNCTION
13
ORDER RECEPTION MANAGEMENT SERVER
14A
ORDER MANAGEMENT SERVER
11A
TEMPORARY ORDER MANAGEMENT SERVER
41a
FIRST ORDER INFORMATION
10a
SECOND ORDER INFORMATION
10b
CUSTOMER'S ORDER DEPARTMENT
41
41b
CUSTOMER'S DELIVERY LOCATION
42
SHIPPING AND TRANSPORTATION OF PRODUCT
DELIVERY PART OF MAIN BASE
10B
11B
CONFIRMATION INFORMATION MANAGEMENT SERVER
15
DELIVERY MANAGEMENT PART
SHIPPING AND TRANSPORTATION OF PRODUCT
21
ORDER RECEPTION MANAGEMENT SERVER
22
BASIC PART MANUFACTURING FACILITY
23
EXPORT MANAGEMENT FACILITY
FIRST PRODUCTION BASE
20
PB
100A
BASIC PART OF W/H
INTERMEDIATE BASE
51
BASIC PART ACCEPTANCE INSPECTION PART
52
BASIC PART CARRY-OUT PART
50
PB
BASIC PART OF W/H
31
ORDER RECEPTION MANAGEMENT SERVER
32
OPTIONAL PART MANUFACTURING FACILITY
PO
33
BASIC PART ACQUISITION MANAGEMENT PART
PB
34
PRODUCT MANUFACTURING FACILITY
PP
35
PRODUCT INSPECTION FUNCTION
SECOND PRODUCTION BASE
30

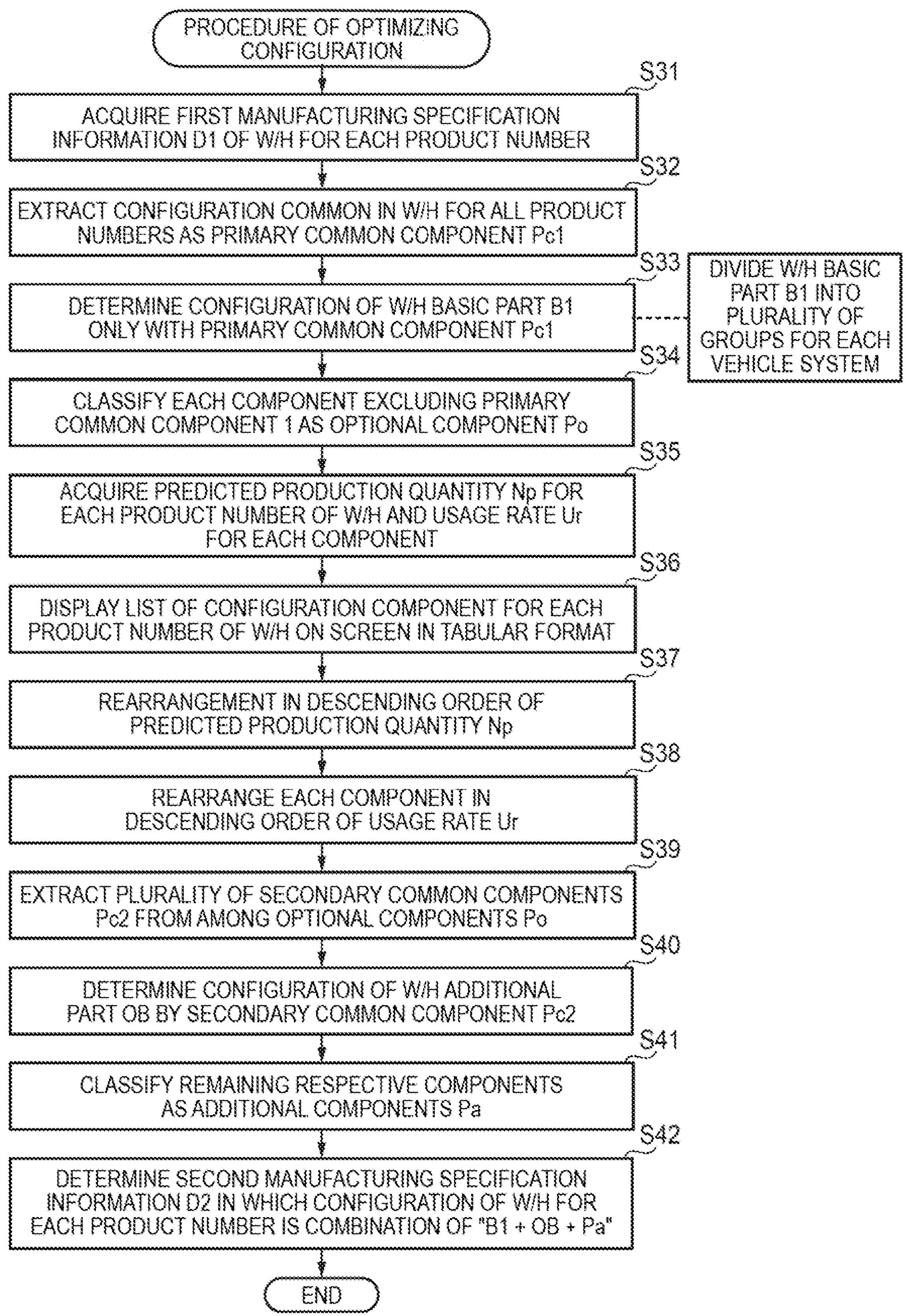
FIG. 6
PROCEDURE OF OPTIMIZING CONFIGURATION
S31
ACQUIRE FIRST MANUFACTURING SPECIFICATION INFORMATION D1 OF W/H FOR EACH PRODUCT NUMBER
S32
EXTRACT CONFIGURATION COMMON IN W/H FOR ALL PRODUCT NUMBERS AS PRIMARY COMMON COMPONENT Pc1
S33
DETERMINE CONFIGURATION OF W/H BASIC PART B1 ONLY WITH PRIMARY COMMON COMPONENT Pc1
DIVIDE W/H BASIC PART B1 INTO PLURALITY OF GROUPS FOR EACH VEHICLE SYSTEM
S34
CLASSIFY EACH COMPONENT EXCLUDING PRIMARY COMMON COMPONENT 1 AS OPTIONAL COMPONENT Po
S35
ACQUIRE PREDICTED PRODUCTION QUANTITY Np FOR EACH PRODUCT NUMBER OF W/H AND USAGE RATE Ur FOR EACH COMPONENT
S36
DISPLAY LIST OF CONFIGURATION COMPONENT FOR EACH PRODUCT NUMBER OF W/H ON SCREEN IN TABULAR FORMAT
S37
REARRANGEMENT IN DESCENDING ORDER OF PREDICTED PRODUCTION QUANTITY Np
S38
REARRANGE EACH COMPONENT IN DESCENDING ORDER OF USAGE RATE Ur
S39
EXTRACT PLURALITY OF SECONDARY COMMON COMPONENTS Pc2 FROM AMONG OPTIONAL COMPONENTS Po
S40
DETERMINE CONFIGURATION OF W/H ADDITIONAL PART OB BY SECONDARY COMMON COMPONENT Pc2
S41
CLASSIFY REMAINING RESPECTIVE COMPONENTS AS ADDITIONAL COMPONENTS Pa
S42
DETERMINE SECOND MANUFACTURING SPECIFICATION INFORMATION D2 IN WHICH CONFIGURATION OF W/H FOR EACH PRODUCT NUMBER IS COMBINATION OF "B1 + OB + Pa"
END COMPONENT NAME
LIST OF OPTIONAL COMPONENTS
W/H PRODUCT NUMBER N
PLANNED NUMBER OF WIRE HARNESSES FOR EACH PRODUCT NUMBER X
A0 A1 A2 A3 A4 An
N1
N2
N3
Nm
X1
X2
X3
Xm
USED
NOT USED
U0 U1 U2 U3 U4 Un
USAGE RATE: Ur = (SUM OF USAGE QUANTITY FOR EACH PRODUCT NUMBER) / (TOTAL PLANNED NUMBER OF WIRE HARNESSES)
SUM = TOTAL PLANNED NUMBER OF WIRE HARNESSES

FIG. 10

| PRODUCT NUMBER | A | B | C | D | E | F | NUMBER OF ADDITIONAL COMPONENTS | TOTAL |
|---|---|---|---|---|---|---|---|---|
| | OB | | | | | | Pa | NT |
| B111 | ● | | | | | | 10 | 11 |
| D912 | | ● | | | | | 15 | 16 |
| Z423 | | ● | ● | | | | 11 | 13 |
| Y914 | ● | | | | | | 10 | 11 |
| K315 | ● | | | | | | 12 | 13 |
| B316 | | | ● | | | | 18 | 19 |
| E717 | | | ● | | | | 10 | 11 |
| P718 | | ● | | | | | 16 | 17 |
| Z619 | ● | | | | | | 12 | 13 |
| K010 | | | ● | | | | 19 | 20 |
| E011 | | | | ● | ● | | 18 | 20 |
| E512 | | | | ● | | | 7 | 8 |
| K513 | | | | ● | | | 5 | 6 |
| M414 | | | | ● | | | 4 | 5 |
| D815 | | | | ● | | | 8 | 9 |
| E816 | | | | | | ● | 17 | 18 |
| K217 | | | | | | ● | 16 | 17 |
| D018 | | | | ● | | | 19 | 20 |
| N119 | | | | | ● | ● | 13 | 15 |
| D310 | | | | | ● | ● | 11 | 13 |
| D411 | | | | | ● | ● | 10 | 12 |
| N212 | | | | | ● | ● | 12 | 14 |
| N313 | | | | | | ● | 13 | 14 |
| E314 | | | | | | ● | 10 | 11 |
| E615 | | | | | | | 15 | 15 |
| K616 | | | | ● | | | 23 | 24 |

COMPONENT MANUFACTURING SYSTEM AND COMPONENT MANUFACTURING METHOD

CROSS REFERENCE TO RELATED APPLICATIONS

This application is based on and claims priority from Japanese patent application No. 2020-133333 filed on Aug. 5, 2020, and Japanese patent application No. 2020-184391 filed on Nov. 4, 2020, the entire contents of which are incorporated herein by reference.

TECHNICAL FIELD

The present invention relates to a component manufacturing system and a component manufacturing method that can be used by a component manufacturer that manufactures a wire harness, which is a vehicle component, based on a customer requirement.

BACKGROUND ART

Generally, a wire harness mounted on a vehicle such as an automobile or the like is an assembly of electric wires integrally formed by bundling a large number of various types of electric wires, and has a complicated shape. The wire harness is used to connect a power source such as an in-vehicle battery or the like to various electrical components on the vehicle, or to connect a plurality of electrical components to each other. The wire harness includes a large number of connectors in order to facilitate attachment and detachment of an electric wire connection portion.

For example, a wire harness manufacturing method and a wire harness manufacturing device of JP-A-2017-152154 discloses a technology for reducing an increase in manufacturing cost when a wire harness having various configurations is manufactured according to various required specifications. Specifically, when forming a wire harness obtained by combining a base harness having basic specifications with one or more optional harnesses that can be selected, specifications of the base harness and specifications of the optional harness are specified according to order information. A configuration of a common circuit in the specifications of the optional harness is extracted, the extracted common circuit is incorporated into the specifications of the base harness, and the configuration of the common circuit is deleted from the specifications of the optional harness, thereby manufacturing a plurality of intermediate structures based on data obtained by rearranging the common circuit, and manufacturing the wire harness by combining the plurality of intermediate structures.

SUMMARY OF INVENTION

Meanwhile, based on requirements such as specifications, a quantity, a delivery date, or the like that a vehicle manufacturer, who is a customer, determines each time, a component manufacturer manufacturing a wire harness for a vehicle manufactures a completed product of the wire harness that meets the requirements by the delivery date, and delivers the completed product thereof to the customer by the designated delivery date. Since there are various types, grades, destinations, or the like of the vehicle mounting the wire harnesses, the component manufacturer respectively manufactures various types of wire harnesses, which are respectively managed by different product numbers, according to the requirements of the vehicle manufacturer or the like.

On the other hand, in consideration of human resources related to the manufacturing of the wire harness, securing various manufacturing facilities, manufacturing costs, or the like, it may be required to manufacture the wire harness overseas outside Japan where the vehicle is manufactured.

However, when the component manufacturer imports the wire harness manufactured overseas from the overseas country into Japan and delivers the imported wire harness to a customer in Japan, it takes about 2 to 3 weeks from shipment of the wire harness in the overseas country to arrival thereof in Japan, such that the component manufacturer is required to consider a problem of the delivery date of the wire harness to be delivered to the customer.

Specifically, after the final number of wire harnesses to be delivered to the customer for each product number is confirmed, a delivery period for the component manufacturer to deliver the wire harness to the customer is only a few days. Therefore, when the wire harness is manufactured overseas, it is required to complete the manufacturing of the corresponding wire harness and to start exporting the wire harness from an overseas factory before the final number of wire harnesses to be delivered for each product number thereof is confirmed.

Therefore, in order to deliver the confirmed number of wire harnesses to the customer by the delivery date without any shortage, the component manufacturer is required to manufacture and import a sufficiently larger number of wire harnesses overseas in advance than the confirmed number thereof in consideration of a possibility of an increase or a decrease in a predicted quantity. Therefore, an extra wire harness, which is not actually delivered, is required to be manufactured such that a storage space is also required, which causes a factor of high cost. However, when the component manufacturer reduces the number of wire harnesses that should be sufficiently manufactured overseas and imported, the component manufacturer may not be able to prepare the wire harness by the delivery date depending on the required number of wire harnesses finally confirmed by the customer, such that a possibility of shortage occurrence becomes high.

According to the embodiment, a component manufacturing system and a component manufacturing method can prevent occurrence of excess inventory of a wire harness, and can also be used for a component manufacturer to deliver the number of wire harnesses required by a customer without any shortage by a delivery date.

According to the embodiment, a component manufacturing system can be used by a component manufacturer that manufactures a wire harness, which is a vehicle component, based on a customer requirement.

The component manufacturing system comprises:

a main base; and a first production base and a second production base located in different regions from each other, wherein the main base has a function of designing a common wire harness commonly used for a plurality of vehicle product numbers and a plurality of optional wire harnesses different for each product number based on plan information from the customer, the first production base has a function of producing the common wire harness based on an order instruction from the main base, the second production base is located closer to a delivery location designated by the customer than the first production base, the second production base has a function of acquiring the common wire harness from the first production base, combining the common wire harness with the optional wire harness based on the order instruction from the main base, and delivering a completed wire harness to the delivery location, and the main base has a first order function of determining the number of common wire harnesses to be produced based on temporary order information and placing an order with the first production base, and a second order function of acquiring order confirmation information from the customer at a timing closer to a delivery date than the temporary order information and placing an order with the second production base for the completed wire harness based on the confirmation information.

According to the embodiment, a component manufacturing method can be used by a component manufacturer that manufactures a wire harness, which is a vehicle component, based on a customer requirement.

The component manufacturing method comprises:

using a main base, and a first production base and a second production base located in different regions from each other;

providing a function, by the main base, of designing a common wire harness commonly used for a plurality of vehicle product numbers and a plurality of optional wire harnesses different for each product number based on plan information from the customer;

providing a function, by the first production base, of producing the common wire harness based on an order instruction from the main base, arranging the second production base to be located closer to a delivery location designated by the customer than the first production base; and providing a function, by the second production base, of acquiring the common wire harness from the first production base, combining the common wire harness with the optional wire harness based on the order instruction from the main base, and delivering a completed wire harness to the delivery location, wherein the main base includes a first order step of determining the number of common wire harnesses to be produced based on temporary order information and placing an order with the first production base, a transportation step of transporting the common wire harness produced by the first production base to the second production base, and a second order step of acquiring order confirmation information from the customer at a timing closer to a delivery date than the temporary order information and placing an order with the second production base for the completed wire harness based on the confirmation information.

According to the embodiment, a component manufacturing system manufactures a wire harness, which is a vehicle component, at a main base and at a first production base and a second production base located in different regions from each other.

The main base includes:

a function of designing a common wire harness commonly used for a plurality of vehicle product numbers and a plurality of optional wire harnesses different for each product number based on plan information from a customer;

a function of transmitting design information for producing the common wire harness to the first production base;

a first order function of determining the number of common wire harnesses to be produced based on temporary order information and placing an order with the first production base;

a function of transmitting design information for producing a completed wire harness by combining the common wire harness with the optional wire harness to the second production base; and a second order function of acquiring order confirmation information from the customer at a timing closer to a delivery date than the temporary order information and placing an order with the second production base for the completed wire harness based on the confirmation information.

BRIEF DESCRIPTION OF DRAWINGS

FIG. 2 is a block diagram illustrating a functional configuration example of a main part in the component manufacturing system of FIG. 1.

FIG. 4 is a block diagram illustrating a functional configuration example of a main part of a component manufacturing system according to a second embodiment of the present invention.

FIG. 6 is a flowchart illustrating an example of a procedure for optimizing a configuration of a wire harness.

FIG. 10 is a front view illustrating a display example of an additional part configuration, the number of additional components, the total number of components, or the like for each wire harness product number.

DESCRIPTION OF EMBODIMENTS

Specific embodiments of the present invention will be described below with reference to the respective drawings.

First Embodiment

Outline of Component Manufacturing System

Figure 1:
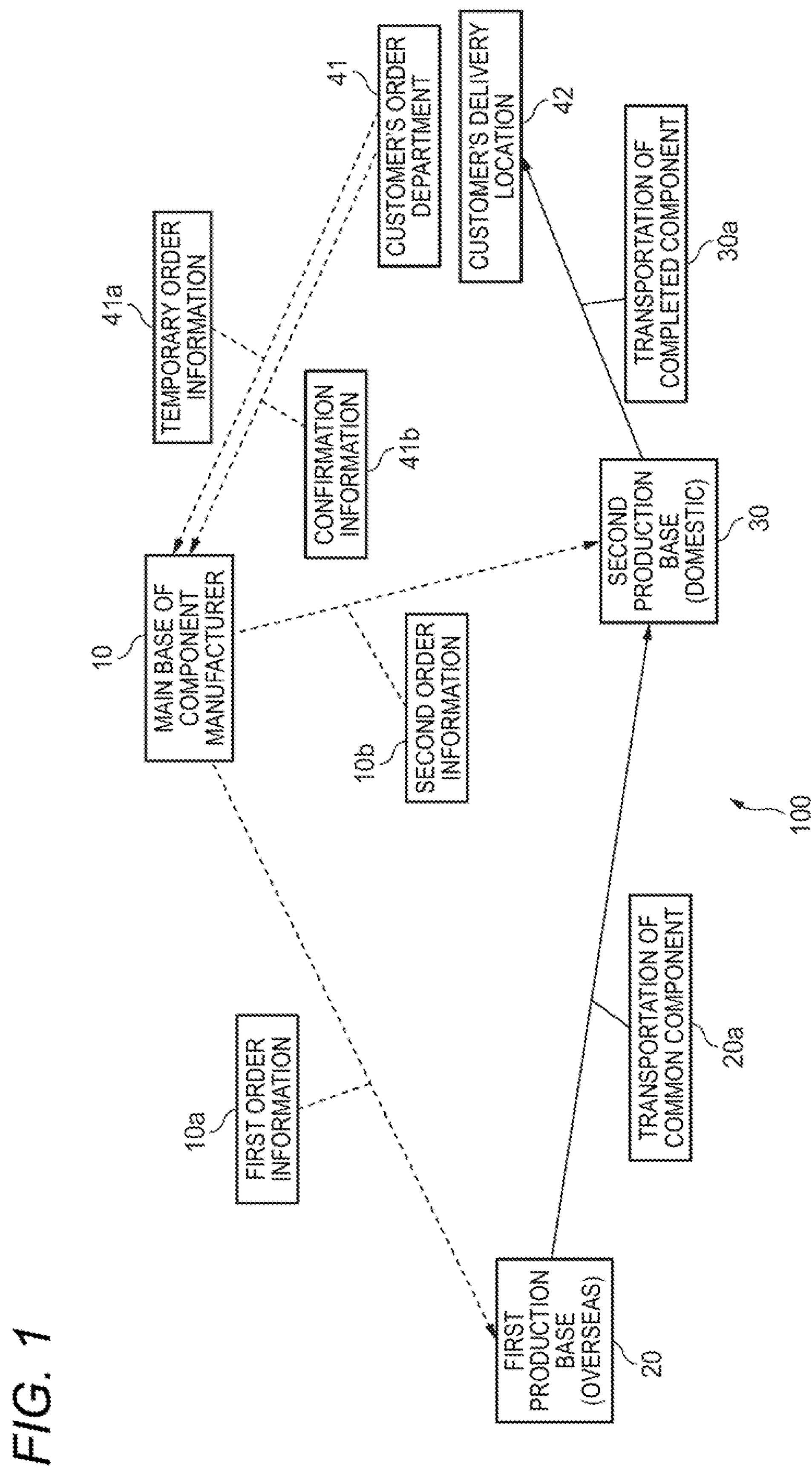
FIG. 1 is a block diagram illustrating a configuration outline of a component manufacturing system according to a first embodiment of the present invention.

FIG. 1 illustrates a configuration outline of a component manufacturing system 100 according to a first embodiment of the present invention.

The component manufacturing system 100 illustrated in FIG. 1 is prepared to be used by a component manufacturer that manufactures a wire harness (W/H) which is a main component to be mounted on a vehicle such as an automobile or the like or an intermediate component thereof. The component manufacturer that manufactures the wire harness usually designs the wire harness based on plan information acquired from a customer, for example, a vehicle manufacturer, prior to the start of mass production of the vehicle. After that, when receiving an order for the wire harness every predetermined period, the component manufacturer manufactures the required number of wire harnesses that meet specifications designated by the customer, and delivers the manufactured wire harnesses to a designated delivery location by a designated delivery date.

The number of days for the delivery date until the component manufacturer delivers the corresponding wire harness product after an order content of the customer, that is, the number of wire harnesses (vehicles) for each product number is finally confirmed is usually expected to take about 2 to 4 days.

On the other hand, when the component manufacturer imports the wire harness manufactured overseas from an overseas country into Japan and delivers the imported wire harness to the customer in Japan, the required period for importing the wire harness is about 2 to 3 weeks.

Therefore, when the wire harness is manufactured overseas, the manufacturing of the corresponding wire harness is required to be completed and export from the overseas factory is required to start before the final number of wire harnesses for each product number is confirmed for the delivery thereof. As a result, the component manufacturer is also required to pre-manufacture extra wire harnesses that exceed the number of wire harnesses required by the customer, such that unnecessary cost is incurred due to the excess wire harnesses that are not delivered to the customer.

The component manufacturing system 100 illustrated in FIG. 1 has a function useful for the component manufacturer to reduce the cost related to the excess wire harness as described above.

The component manufacturing system 100 includes a main base 10, a first production base 20, and a second production base 30 as bases to be used by the component manufacturer that manufactures a wire harness PP. It is assumed that each of the first production base 20 and the second production base 30 is, for example, a factory of a related subsidiary of the component manufacturer that manufactures the wire harness product.

Here, it is assumed that the first production base 20 is located in a distant area such as an overseas country, and it is assumed that the second production base 30 is located in a place such as a domestic country or the like that is closer to a customer's delivery location 42 than the first production base 20. That is, the component manufacturing system 100 includes the first production base 20 that manufactures a component that can be allowed to take a long time to be transported to a location close to the customer, and the second production base 30 that can deliver the manufactured component to the customer in a short period of time.

A customer's order department 41 orders a product of the required wire harness PP to the main base 10 of the component manufacturer based on a production plan for an automobile or the like at the customer. It is expected that the production plan (a planned production quantity for each vehicle model) at the customer will change depending on a situation. After that, specifications and a quantity for each product number of the wire harness PP officially ordered to the component manufacturer are confirmed.

Therefore, the main base 10 of the component manufacturer individually acquires temporary order information 41*a* and confirmation information 41*b* at timings different from each other as illustrated in FIG. 1 as an order for the wire harness from the customer. The temporary order information 41*a* is periodically transmitted from the customer's order department 41 to the main base 10 at a frequency such as once a month or the like. Alternatively, the temporary order information 41*a* can be acquired from the customer's order department 41 by an operation of the main base 10. The confirmation information 41*b* is transmitted from the customer to the main base 10 several days before the delivery date after the specifications and quantity for each product number thereof at the customer are confirmed.

At the main base 10, in order to manufacture the wire harness PP for each product number to be delivered to the customer as a product, a basic part B1 and an optional part OP of the wire harness are designed in advance (second manufacturing specification information D2 described later) based on the plan information from the customer (first manufacturing specification information D1 described later). The basic part B1 is a sub-harness formed of only elements that are commonly provided in the wire harnesses for a plurality of product numbers or the wire harnesses for all the product numbers. The optional part OP is a sub-harness corresponding to a difference configuration peculiar to each wire harness having different specifications for each product number. That is, the sub-harness of the basic part B1 and the sub-harnesses of various optional parts OP are combined with each other, thereby making it possible to respectively form the wire harnesses PP of the products meeting the specifications of wire harnesses for various product numbers.

The main base 10 transmits the information on the sub-harness of the designed basic part to the first production base 20 in advance, and the first production base 20 constructs a line for manufacturing the sub-harness. The main base 10 transmits first order information 10*a* including the required number of sub harnesses to the first production base 20, and places an order for the basic part B1 to be manufactured in the first production base 20. The first production base 20 manufactures the sub-harness of the basic part B1 according to the first order information 10*a* transmitted from the main base 10. The first production base 20 inspects the manufactured sub-harness of the basic part B1, and then performs "transportation 20*a* of the basic part B1". That is, the basic part B1 is exported from the overseas country and delivered to the second production base 30 in Japan.

Here, it takes one week or more for the transportation from the first production base 20 to the second production base 30. However, since the first production base 20 manufactures the sub-harness of the basic part B1 based on the first order information 10*a* ordered after the temporary order information 41*a*, the basic part B1 can be delivered to the second production base 30 at a timing where sufficient time is left with respect to the delivery date of the wire harness of the product.

After receiving the confirmation information 41*b* from the customer's order department 41, the main base 10 transmits second order information 10*b* to the second production base 30, and orders the manufacturing and delivery of the wire harness of the product at a timing to meet the delivery date of the product. The second order information 10*b* includes the specifications and confirmed quantity for each product number, the information of each optional part OP, or the like. The second order information 10*b* may include the information of the basic part B1.

The second production base 30 sequentially accepts the sub-harnesses of the basic parts manufactured at the first overseas production base 20. The second production base 30 manufactures the required number of respective optional parts OP according to the second order information 10*b*. The second production base 30 combines each manufactured optional part OP and the sub-harness of the basic part B1 accepted from the first overseas production base 20 according to the product specifications for each product number, and manufactures the wire harness PP of the product so as to meet the delivery date. The second production base 30 performs "transportation 30*a* of the wire harness" and delivers the wire harness PP of the product for each product number to the customer's delivery location 42.

Here, since the second production base 30 is closer to the customer's delivery location 42 than the first production base 20, it is easy to shorten the time required for transportation until the manufactured wire harness PP is delivered to the customer's delivery location 42. Since the second production base 30 is not required to manufacture the sub-harness of the basic part B1, the required number of days from the generation of the second order information 10*b* to the delivery of the wire harness PP of the product can be shortened.

Since the first production base 20 manufactures and exports the sub-harness of the basic part B1 according to the first order information 10*a* generated at a timing in response to the temporary order information 41*a*, the basic part B1 can be delivered to the second production base 30 at the timing where the sufficient time is left with respect to the delivery date of the wire harness of the product even though it takes a large number of days to perform the transportation 20*a* of the basic part B1.

Since the second production base 30 combines the sub-harness of the basic part B1 with each optional part OP to manufacture the wire harness PP of the product for each product number, it is possible to reduce an error between ordered number of the wire harnesses for each product number in the confirmation information 41*b* and used number of the manufactured basic parts B1. That is, it is possible not only to reduce an excess portion of each manufactured optional part OP to almost 0, but also not to be required to excessively manufacture all the wire harnesses PP of the products for each product number at an overseas production base and to transport and store the manufactured wire harnesses PP as in the past. By establishing the first production base 20 overseas, it becomes easy to secure human resources, manufacturing facilities, or the like such that the manufacturing cost can be further reduced.

Functional Configuration Example of Main Part

FIG. 2 illustrates a functional configuration example of the main part in the component manufacturing system 100 of FIG. 1.

Function of Main Base 10

The main base 10 illustrated in FIG. 2 includes an order reception management server 11, a basic part design function 12, an optional part design function 13, and an order management server 14.

The order reception management server 11 respectively acquires the temporary order information 41*a* and the confirmation information 41*b* from the customer's order department 41 via a digital communication line such as the Internet, and has a function of performing necessary processing in response to the received information.

The basic part design function 12 is a function of designing the sub-harness of the basic part B1 based on the wire harness specifications for each vehicle product number provided in the first manufacturing specification information D1 (or the temporary order information 41*a*) acquired by the order reception management server 11. The sub-harness of the basic part B1 corresponds to a part of the components commonly provided in the wire harnesses PP of all the product numbers or a plurality of product numbers, that is, a base element. Normally, a plurality of types of sub-harnesses are individually generated as the basic part B1. For example, it is assumed that a plurality types such as a sub-harness for connecting elements related to an engine, a sub-harness for connecting various electrical components around a steering wheel, or the like are respectively generated as different types of basic parts.

The basic part design function 12 may automatically design the sub-harness of the basic part B1, and may include only a function of supporting the design work in response to an input operation of a designer.

The optional part design function 13 is a function of designing the sub-harnesses of a plurality of optional parts OP based on the wire harness specifications for each vehicle product number provided in the first manufacturing specification information D1 (or the temporary order information 41*a*) acquired by the order reception management server 11. The sub-harness of the optional part OP corresponds to the one obtained by extracting only a part of the components peculiar to the wire harness of each product number from among the components of the wire harnesses PP of a plurality of product numbers whose types are different from each other. The optional part design function 13 may automatically design the sub-harness of the optional part, or may include only a function of supporting the design work in response to the input operation of the designer.

Therefore, the sub-harness of the basic part B1 designed by the basic part design function 12 and the sub-harness of one or more of the optional parts OP designed by the optional part design function 13 are combined with each other, thereby making it possible to form the whole wire harness of any one product number, that is, the wire harness PP of the product to be delivered to the customer.

The order management server 14 has a function of transmitting the first order information 10*a* to the first production base 20 at a timing slightly later than a timing when the temporary order information 41*a* is generated, based on the information of the sub-harness of the basic part B1 designed by the basic part design function 12. The order management server 14 has a function of transmitting the second order information 10*b* to the second production base 30 at a timing slightly later than a timing when the confirmation information 41*b* is generated, based on the information of the sub-harness of the optional part OP designed by the optional part design function 13 and the information of the sub-harness of the basic part B1. It assumed that, for example, the digital communication line such as the Internet is used to perform communication between the order management server 14 and the first production base 20, and communication between the order management server 14 and the second production base 30.

The order reception management server 11, the basic part design function 12, the optional part design function 13, and the order management server 14 can be implemented by combining hardware of one or more communicable computers with software required for performing respective functions thereof.

Function of First Production Base 20

The first production base 20 illustrated in FIG. 2 includes an order reception management server 21, a basic part manufacturing facility 22, and an export management facility 23.

The order reception management server 21 has a function of receiving the first order information 10*a* from the main base 10. The order reception management server 21 further generates an instruction for securing an electric wire, a terminal, a connector, or the like which are components required for manufacturing the basic part, and instructs the basic part manufacturing facility 22 to start manufacturing after securing the above-described components, based on information on the required quantity related to the sub-harness specifications of the basic part B1 provided in the received first order information 10*a*, design information acquired in advance, or the like.

The basic part manufacturing facility 22 has a function of actually manufacturing the sub-harness based on the information on the required quantity related to the sub-harness of the basic part B1 acquired from the order reception management server 21, or the like. Specifically, the basic part manufacturing facility 22 is implemented by a facility that automatically performs respective steps such as cutting each electric wire, mounting a terminal on each electric wire, mounting a connector, arranging a large number of electric wires, wrapping a tape, mounting an exterior member, assembling, inspection, or the like, or by a facility that supports a manual work of a worker. As for the inspection, continuity inspection between a plurality of terminals of the sub-harness and appearance inspection by the eyes of the worker are carried out. A special facility may be used to support the inspection of the worker.

The export management facility 23 exports the sub-harness of each basic part B1 manufactured by the basic part manufacturing facility 22 by using a predetermined transportation route, and performs a management procedure so that the sub-harness thereof is delivered to a location of the second production base 30 within a predetermined period. A period from when the first production base 20 starts an export procedure of the basic part B1 until when the basic part B1 is delivered to the second production base 30 may fluctuate depending on a difference in countries and areas where the first production base 20 is located, and since the transportation thereof is performed by sea, for example, a period of about 1 to 3 weeks is required.

Function of Second Production Base 30

The second production base 30 illustrated in FIG. 2 includes an order reception management server 31, an optional part manufacturing facility 32, a basic part acquisition management part 33, a product manufacturing facility 34, a product inspection function 35, and a product shipping management function 36.

The order reception management server 31 has a function of receiving the second order information 10*b* from the main base 10. The order reception management server 31 generates an instruction for securing an electric wire, a terminal, a connector, or the like which are components required for manufacturing each optional part OP, and instructs the optional part manufacturing facility 32 to start manufacturing after securing the components, based on information on the required quantity related to the sub-harness specifications of each optional part OP provided in the received second order information 10*b*, design information received in advance from the main base 10, or the like.

The optional part manufacturing facility 32 has a function of actually manufacturing the optional sub-harness of each product number based on the design information of the sub-harness of each optional part OP acquired from the order reception management server 31. Specifically, the optional part manufacturing facility 32 is implemented by a facility that automatically performs respective steps such as cutting each electric wire, mounting a terminal on each electric wire, mounting a connector, arranging a large number of electric wires, wrapping a tape, mounting an exterior member, assembling, inspection, or the like, or by a facility that supports a manual work of a worker.

The basic part acquisition management part 33 acquires the basic part B1 delivered as a result of the transportation 20*a* of the basic part B1 from the first production base 20, performs acceptance inspection of the basic part B1 as necessary, and then manages the basic part B1 so that the basic part B1 can be supplied to the product manufacturing facility 34 according to a product manufacturing schedule at the second production base 30.

The product manufacturing facility 34 has a function of manufacturing the wire harness PP by combining one or more specific optional parts OP selected according to the product number of each product from among a large number of optional parts OP manufactured by the optional part manufacturing facility 32 with one basic part B1 acquired by the basic part acquisition management part 33. Specifically, the product manufacturing facility 34 is implemented by a facility that automatically performs respective steps such as arrangement in a state where a plurality of sub-harnesses are combined with each other, inserting a terminal into an empty cavity of each connector, wrapping a tape, mounting an exterior member, or the like, or by a facility that supports a manual work of a worker.

The product inspection function 35 has a function of inspecting whether or not each of the wire harnesses PP manufactured by the product manufacturing facility 34 satisfies the specifications of the wire harness PP for each product number to be delivered. Specifically, the product inspection function 35 is implemented by a facility that automatically performs respective steps such as continuity inspection between connector terminals, appearance inspection, or the like or by a facility that supports a manual work of a worker.

The product shipping management function 36 arranges the transportation 30*a* of the wire harness PP so that the wire harness PP, the inspection of which is completed, can be delivered to the customer's delivery location 42 by the delivery date designated by the customer.

Example of Timing of Processing and Procedure Thereof

Figure 3:
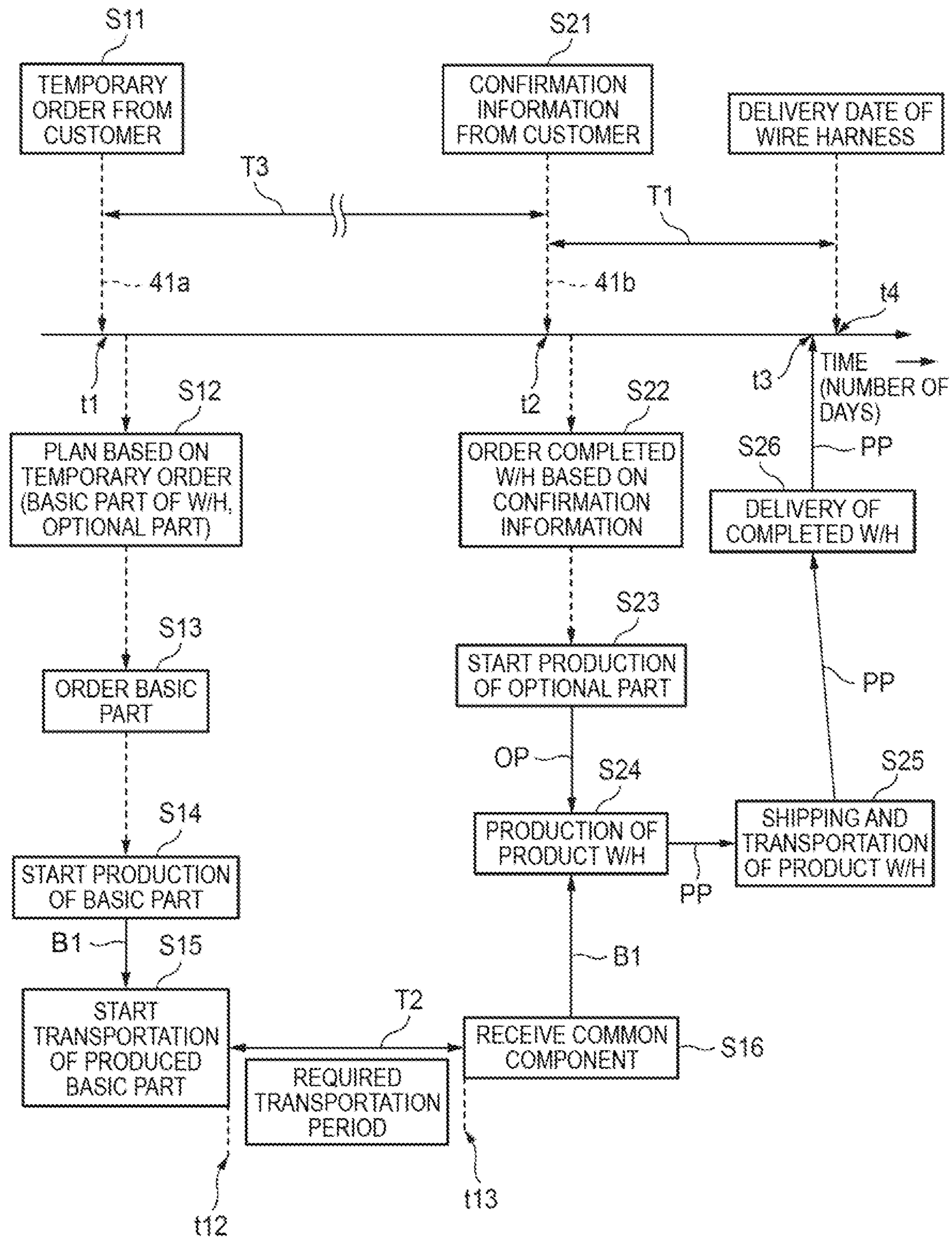
FIG. 3 is a time chart illustrating a timing of processing and a procedure thereof in each part of the component manufacturing system.

FIG. 3 illustrates a representative example of a timing of processing and a procedure thereof in each part of the component manufacturing system 100. The example of FIG. 3 will be described below. The main base 10 of the component manufacturing system 100 designs in advance the basic part B1 and the optional part OP based on the plan information from the customer, for example, based on a design method of the wire harness which will be described later.

For example, a production plan of a customer such as an automobile manufacturer or the like is generated at various timings and is changed sequentially according to a situation. However, even though a content of the production plan is not confirmed yet, at a certain time point t1, for example, once a month, the customer's order department 41 places a temporary order with the main base 10 of the component manufacturer for the wire harness PP, which is a component, based on the production plan at that time point (S11). That is, unconfirmed information such as specifications, required quantity, or the like for each product number of the wire harness PP is provided to the component manufacturer.

The main base 10 of the component manufacturer makes the production plan of the wire harness PP of the product to be delivered based on the temporary order information acquired from the customer (S12). The wire harness to be designed is configured as a combination of the basic part B1 and the optional part OP, and a production quantity of the basic parts B1 existing regardless of a difference in product numbers is determined at least at this time point. The optional part OP is a remaining component after the basic part B1 is excluded from the wire harness for each product number, and the production plan for the optional part OP may be also made to some extent at this time point.

The main base 10 of the component manufacturer transmits information including a content of the designed basic part B1 and a required quantity thereof to the first production base 20 as the first order information 10*a* (S13).

The first production base 20 starts production of the basic part B1 based on the first order information 10*a* acquired from the main base 10 (S14).

After manufacturing the basic part B1, the first production base 20 starts transportation for delivering the manufactured basic part B1 to the second production base 30 at a certain time point t12 (S15). Since this transportation involves import and export and long-distance transportation is performed by sea, a required transportation period T2 is, for example, about two weeks.

The second production base 30 can receive the basic part B1 shipped from the first production base 20 at a certain time point t13 (S16).

On the other hand, the production plan of the customer such as the automobile manufacturer or the like, that is, the specifications and number of required wire harnesses PP for each product number are confirmed at a certain time point t2, and a few days later, it is required for the component manufacturer to deliver the required wire harnesses PP to the customer's delivery location 42 by a certain time point t4. Therefore, the customer's order department 41 transmits the confirmation information 41*b* to the main base 10 of the component manufacturer at that time point (S21).

That is, a delivery date (T1) given to the component manufacturer from the confirmation of the specifications and number of wire harnesses PP to the delivery of the wire harnesses PP is about a few days.

When acquiring the confirmation information 41*b* at a certain time point, the main base 10 of the component manufacturer places an order with the second production base 30 for the manufacturing and delivery of the wire harness PP of the product completed based on the confirmation information 41*b* (S22) as the second order information 10*b*. Specifically, the main base 10 transmits the second order information 10*b* including information on a required number of various types of optional parts OP required for forming the wire harness PP for each product number, the specifications and required number of wire harnesses PP for each product number, or the like.

The second production base 30 starts manufacturing of each optional part OP based on the information (S23) at the time of acquiring the second order information 10*b* from the main base 10.

After completing the manufacturing of each optional part OP, the second production base 30 combines one or more of these optional parts OP with the basic part B1 acquired from the first production base 20, and one or more of these optional parts OP and the basic part Blare assembled to be integrated with each other, thereby manufacturing the wire harness PP of the product for each product number (S24).

After inspecting the manufactured wire harnesses PP of the products for each product number, the second production base 30 ships and transports the wire harnesses PP to the customer's delivery location 42, and delivers the wire harnesses PP at a time point t3 before a delivery date t4 (S25, S26).

That is, when the first production base 20 exists overseas, the number of days required for the transportation increases, such that when production starts at the time point t2 at which the specifications and number of wire harnesses PP are confirmed by the customer, the wire harness PP cannot be delivered by the delivery date t4. However, since the specifications of the basic part B1 are common to the wire harnesses PP of all the product numbers, the basic part B1 can be specified by the main base 10 and production thereof can start at the first production base 20 before the specifications of the wire harness PP are confirmed, and the basic part B1 can be delivered to the second production base 30 by a certain timing close to the time point t2 at which the specifications and number of wire harnesses PP are confirmed. Since the basic part B1 is common to the wire harnesses PP of all the product numbers, the excess number of the basic parts B1 manufactured by the first production base 20 can be reduced to the minimum.

In the example illustrated in FIG. 3, the second production base 30 does not start the manufacturing of the optional part OP until the time point t2 at which the second order information 10*b* is generated. However, even before a final delivery quantity (Nx) for each product number is confirmed, the manufacturing of the optional part OP may start, with respect to a minimum quantity (No: No<Nx) that is expected to be required in advance, at the time point before the second order information 10*b* is generated.

Second Embodiment

FIG. 4 illustrates a functional configuration example of a main part of a component manufacturing system according to a second embodiment of the present invention.

A component manufacturing system 100A illustrated in FIG. 4 is a modification of the component manufacturing system 100 illustrated in FIG. 1. The following description will be omitted for the same element as that of the component manufacturing system 100 represented by the same reference sign.

The component manufacturing system 100A illustrated in FIG. 4 includes a main body part 10A and a delivery part 10B of the main base 10 belonging to the component manufacturer, and the first production base 20, an intermediate base 50, and the second production base 30. That is, the delivery part 10B, which performs a procedure of delivering the wire harness PP of the product to the customer's delivery location 42, is separated from the main body part 10A of the main base 10 and exists as an independent department. The intermediate base 50 that relays between the first production base 20 and the second production base 30 is added.

In the main body part 10A of the main base 10, a temporary order management server 11A receives the temporary order information 41*a* from the customer's order department 41. The basic part design function 12 designs the sub-harness which is a component common to the wire harnesses PP of a plurality of product numbers or all the product numbers based on the plan information (the first manufacturing specification information D1 described later) received in advance from the customer's order department 41. This design information is transmitted to the first production base 20 in advance. The optional part design function 13 designs a plurality of types of sub-harnesses of the optional part OP among the components provided in the wire harnesses of a plurality of product numbers based on the plan information (the first manufacturing specification information D1) received in advance from the customer's order department 41. The design information is transmitted to the second production base 30 in advance. The wire harness PP of each product number is formed by a combination of the sub-harness of one basic part B1, one or more types of optional parts OP, and other additional components Pa.

An order management server 14A of the main body part 10A transmits the first order information 10*a* including the information on the required number of basic parts B1 designed by the basic part design function 12 to the first production base 20. The information on each optional part designed by the optional part design function 13 is transmitted to the confirmation information management server 11B of the delivery part 10B at a timing when the information is necessary.

The first production base 20 manufactures the sub-harness of the basic part B1 based on the ordered number of sub-harnesses thereof according to the first order information 10*a*, and when the manufacturing thereof is completed, the first production base 20 starts a transportation procedure so that the manufactured basic part B1 is delivered to the intermediate base 50.

The intermediate base 50 includes a basic part acceptance inspection part 51, a basic part carry-out part 52, and a server (not illustrated). The server of the intermediate base 50 manages information representing the specifications and number of basic parts B1 that are accepted by the intermediate base 50 and are to be transmitted to the second production base 30. The basic part acceptance inspection part 51 accepts the basic part B1 exported and imported from the first production base 20 and performs an appearance inspection to check whether or not the required specifications of the basic part B1 are satisfied. This appearance inspection is performed by using an automated inspection facility or a facility for supporting inspection by the eyes of the worker.

The basic part carry-out part 52 of the intermediate base 50 carries out the basic part B1 of which inspection is completed in the basic part acceptance inspection part 51 and which passes the inspection at an appropriate timing, that is, usually at the same date and time as the generation of the confirmation information 41*b*, and performs a procedure of delivering the basic part B1 to the second production base 30.

When the customer's order department 41 transmits the confirmation information 41*b*, the confirmation information management server 11B of the delivery part 10B receives the confirmation information 41*b*. The confirmation information management server 11B confirms the number of wire harnesses PP for each product number to be delivered by the delivery part 10B by the confirmation information 41*b*. The confirmation information management server 11B transmits design information of each optional part OP, information on a combination of the basic part B1 and the optional part OP for each product number, the number of wire harnesses PP for each product number, or the like as the second order information 10*b* to the second production base 30.

At the second production base 30, the order reception management server 31 receives the second order information 10*b* from the delivery part 10B. Next, the order reception management server 31 instructs the optional part manufacturing facility 32 to start the manufacturing of each necessary optional part OP. On the other hand, the basic part acquisition management part 33 of the second production base 30 can receive the basic part B1 manufactured at the first production base 20 via the intermediate base 50 at a timing close to the same date and time as the generation of the confirmation information 41*b*.

The product manufacturing facility 34 of the second production base 30 can manufacture the wire harness PP in a short period of time by combining one or more optional parts OP selected from among a plurality of types of optional parts OP manufactured by the optional part manufacturing facility 32 with the basic part B1 received by the basic part acquisition management part 33 for each product number of the wire harness.

The product inspection function 35 of the second production base 30 performs continuity inspection between a plurality of terminals of the wire harness PP manufactured by the product manufacturing facility 34 and appearance inspection of the wire harness PP. Next, the wire harness PP that passes the inspection is shipped, and transported and delivered to the delivery part 10B of the main base 10.

The delivery part 10B of the main base 10 delivers the wire harness PP received from the second production base 30 to the customer's delivery location 42 by the delivery date designated by the customer.

As described above, with the component manufacturing systems 100 and 100A according to the embodiments of the present invention, since the component produced at the first production base 20 that exists far away such as overseas or the like can be limited to the basic part B1, the shortage is eliminated and it is not required to overproduce all the wire harnesses PP for each product number to be delivered to the customer even though the manufacturing starts before the delivery quantity of the wire harnesses for each product number is confirmed, thereby making it possible to reduce cost. Even though it takes a long time to perform the transportation of the basic part B1 involving the import and export, it becomes possible to supply the required number of basic parts B1 to the second production base 30 near the timing when the confirmation information 41*b* is generated. Therefore, even though a period from the confirmation of the number of wire harnesses PP for each product number to be delivered to the customer to the delivery date is short such as several days, it is possible to deliver the wire harness PP to the customer by the delivery date by using the overseas factory without generating the shortage and a large number of excess components.

In the above description, a case where the optional part OP is manufactured at the second production base 30 and the manufactured optional part OP is combined with the basic part B1 is described, and the optional part OP may be delivered to the second production base 30 in a state of being manufactured at a base different from the second production base 30. In this case, the base for producing the optional part OP is disposed at a location where the optional part OP can be delivered to the second production base 30 in a short period of time. This base can acquire the design information of the optional part OP in advance from the main base 10. When acquiring the second order information 10*b* from the main base 10, the second production base 30 places an order with this base for the optional part OP necessary for producing the wire harness PP.

Design Method of Wire Harness

Hereinafter, a design method of the wire harness that can be used in the component manufacturing system will be described.

Configuration Example of Wire Harness

Figure 5A:
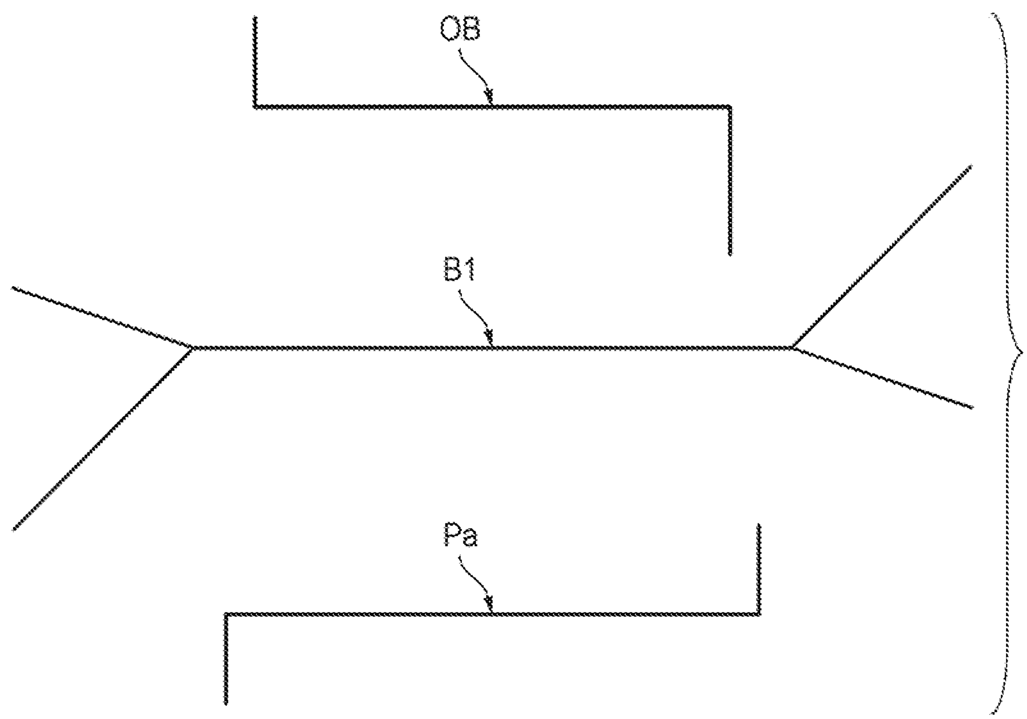
FIG. 5A is a plan view illustrating an example of a combination of wire harness components.
Figure 5B:
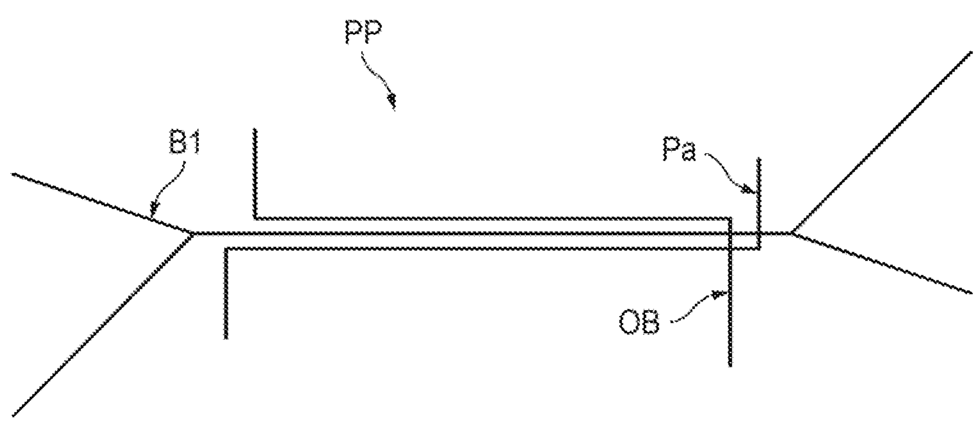
FIG. 5B is a plan view illustrating an example of a manufactured wire harness.

An example of a combination of the wire harness components is illustrated in FIG. 5A, and an example of the manufactured wire harness PP is illustrated in FIG. 5B.

For example, when receiving an order for the wire harness from a customer such as an automobile manufacturer or the like, the component manufacturer that manufactures the wire harness PP receives the first manufacturing specification information D1 representing the specifications of the corresponding wire harness. Therefore, the component manufacturer manufactures the wire harness PP based on the first manufacturing specification information D1. The first manufacturing specification information D1 is usually transmitted from the customer at a timing earlier than the temporary order information 41*a*.

For example, basically, the wire harness PP is an assembly of electric circuits that connect one terminal of an electrical component provided on a vehicle to one terminal of another electrical component provided thereon, and is formed by bundling a large number of electric wire groups disposed along a predetermined wiring path. Usually, a terminal for connection is pressed at an end of each electric wire, and the terminal of each electric wire is mounted on a predetermined portion of a predetermined connector. The predetermined portion on an outside of the wire harness is covered with a protective exterior material.

Therefore, in a simplified description, for example, the wire harness PP becomes a shape as illustrated in FIG. 5B. The automobile manufacturer manufactures various types of vehicles, and these vehicles have respectively different electric circuit configurations and wiring paths depending on a difference in destinations, a difference in grades, or the like. Therefore, it is required to individually manufacture a large number of types of wire harnesses PP which are respectively managed by a different product number. An allowable period from when the number of wire harnesses PP to be produced for each product number is confirmed until when the component manufacturer delivers the wire harnesses PP is very short, for example, about a few days.

Therefore, the component manufacturer is required to manufacture and prepare the required number of wire harnesses PP for each product number efficiently in a short period of time and without excess or deficiency. It is also necessary to reduce the manufacturing cost. In order to meet the above-described conditions, the component manufacturer devises a manufacturing method of the wire harness PP, designs the second manufacturing specification information D2 for efficiently manufacturing the wire harness PP based on the first manufacturing specification information D1, and manufactures the wire harness PP for each product number according to the designed second manufacturing specification information D2.

When applying the wire harness design method of the present invention, the basic part B1, an additional part OB, and an additional component Pa illustrated in FIG. 5A are respectively manufactured in advance, and are combined with each other to be assembled, thereby manufacturing the wire harness PP as illustrated in FIG. 5B.

The basic part B1 is a component of a part of the whole wire harness PP of the product, and indicates a component commonly provided in the wire harnesses PP of all the product numbers, that is, a sub-harness formed of only a primary common component.

The actual basic part B1 is manufactured as each independent sub-harness for respective systems of a plurality of wiring parts grouped on the automobile. For example, the sub-harnesses of the basic parts B1 respectively connected to a steering wheel system, an engine system, a transmission system, a brake system, or the like are designed and manufactured as intermediate components independent of each other.

The additional part OB is a sub-harness formed of a plurality of components (optional components) forming a remaining component after the configuration of the basic part B1 is excluded from the whole wire harness PP of each product number. The additional part OB is formed of only an optional component that is commonly provided in the wire harnesses of a plurality of product numbers, that is, a secondary common component. The optional component which becomes a target of the secondary common component is limited to a component that satisfies a specific condition. Specifically, as will be described later, among the components of the wire harnesses of a plurality of product numbers which are predicted to be produced in large quantities, a component of which usage rate is equal to or greater than a predetermined value is selected.

Actually, the sub-harnesses of a plurality of types of additional parts OB are designed and manufactured as intermediate components independent of each other, depending on a situation of an in-vehicle system. Each of the additional parts OB is the intermediate component formed of, for example, several to several tens of electric wires, terminals, connectors, or the like.

The additional component Pa is each remaining component of the optional components, which is not adopted as the secondary common component of any one of the additional parts OB. Each of the additional components Pa is a small-scale component formed of, for example, one to several electric wires, terminals, connectors, or the like.

Therefore, the sub-harness of the basic part B1 (actually, a plurality of sub-harnesses thereof), the sub-harness of one or a plurality of additional parts OB selected according to the product number, and the remaining necessary additional components Pa are assembled as illustrated in FIG. 5B, thereby making it possible to form the wire harness PP of any product number.

An important fact herein is that the sub-harness of the basic part B1 is formed of only the primary common component, and further, the sub-harness of the additional part OB is formed of only the secondary common component. Therefore, even though the number of wire harnesses PP for each product number required by the customer fluctuates, there will be no excess or deficiency in the sub-harness of the basic part B1 when a change in the total number of wire harnesses PP irrelevant to the product number is small. Therefore, even though the manufacturing of the sub-harness of the basic part B1 starts before the number of wire harnesses PP for each product number required by the customer is confirmed, the problem is unlikely to occur.

The sub-harness of the additional part OB can be assembled to the wire harnesses PP of a plurality of types of product numbers. Therefore, for example, when the required number of one of the wire harnesses PP of two types of product numbers that can use the sub-harness of the same additional part OB increases and the required number of the other thereof decreases, the number of required additional parts OB hardly varies, such that the problem of excess or deficiency in manufacturing quantity hardly occurs. Therefore, even though the manufacturing of the sub-harness of the additional part OB starts before the number of wire harnesses PP for each product number required by the customer is confirmed, the problem hardly occurs.

Particularly, the component of which usage rate is equal to or greater than the predetermined value is preferentially selected as the secondary common component among the components of the wire harnesses of a plurality of product numbers which are predicted to be produced in large quantities, thereby making it possible to increase a possibility that the sub-harness of the additional part OB can be used as the intermediate component common to the wire harnesses of various product numbers, and also to increase the number of common intermediate components. As a result, even though the period from the confirmation of the required number of wire harnesses for each product number to the delivery of those wire harnesses PP is short, it becomes easy to manufacture the required number of wire harnesses PP for each product number without excess or deficiency, and an efficient manufacturing step can be implemented.

Procedure of Optimizing Configuration of Wire Harness

FIG. 6 illustrates an example of a procedure for optimizing a configuration of the wire harness when the wire harness design method according to the present invention is implemented. That is, the component manufacturer that manufactures the wire harness PP performs processing illustrated in FIG. 6, thereby making it possible to design the second manufacturing specification information D2 of which configuration is optimized in order to efficiently manufacture the wire harness PP based on the first manufacturing specification information D1 provided by the customer.

Actually, a designer of the component manufacturer can perform the processing illustrated in FIG. 6 by using a design support device which is not illustrated. In the same manner as that of a general computer system, this design support device can be configured by combining hardware including a central processing unit (CPU), a storage device, an input device, a display, a communication device, or the like, dedicated application software for reading and processing the first manufacturing specification information D1, and special software for implementing characteristic functions of the present invention (each step in FIG. 6). Hereinafter, a processing procedure of FIG. 6 will be described.

For example, in the vehicle manufacturer, a configuration of the electrical system and a wiring path of the wire harness vary depending on a type of vehicle on which the wire harness PP is mounted, such that it is required to prepare separate wire harnesses PP having different product numbers and specifications for each type of vehicle before starting the manufacturing of the vehicle.

The design support device installed in the component manufacturer's company communicates with a computer of the vehicle manufacturer which is the customer, thereby acquiring the first manufacturing specification information D1 representing the specifications of the wire harness PP for each product number (S31). This processing is performed at a timing where sufficient time is left for the delivery date of the corresponding wire harness PP. Contents of the first manufacturing specification information D1 include design drawing data necessary for manufacturing the target wire harness PP, specification list information for each product number, and a physical wiring diagram.

The design support device extracts all the components (circuits such as individual electric wires or the like) commonly present in the wire harnesses PP for all the product numbers as a primary common component Pc1 based on the first manufacturing specification information D1 (S32).

The design support device determines the configuration of the sub-harness of the basic part B1 formed of only a large number of primary common components Pc1 extracted in S32 (S33). In the embodiment, the large number of primary common components Pc1 are divided into 6 types of groups for each vehicle system, and configured as the sub-harnesses of the basic parts B1 respectively independent for each group. For example, a plurality of sub-harnesses of the basic parts B1, which are independent for each group such as for a steering wheel system, for an engine system, for a transmission system, for a brake system, or the like, are generated.

The design support device classifies each remaining component excluding all the primary common components Pc1 extracted in S32 among the components forming the wire harnesses PP of all the product numbers as an optional component Po (S34).

The design support device acquires a predicted production quantity Np for each product number of the wire harness PP and a usage rate Ur for each component (S35).

For example, it is assumed that the predicted production quantity Np for each product number thereof is determined to be the same number as the number of vehicles that the vehicle manufacturer plans to produce for each vehicle type before production of the vehicle, or to be the number close thereto. That is, since the same number of wire harnesses PP as the number of vehicles to be produced for each vehicle type is required, the predicted production quantity Np for each product number of the wire harness PP is expected to be the same number as the planned number of vehicles to be produced for each vehicle type in the vehicle manufacturer.

The usage rate Ur (Usage rate) for each component can be calculated by the following formula.

Ur=(sum of each component usage quantity for each product number)/(total planned number of W/Hs for all the product numbers)

Figure 7:
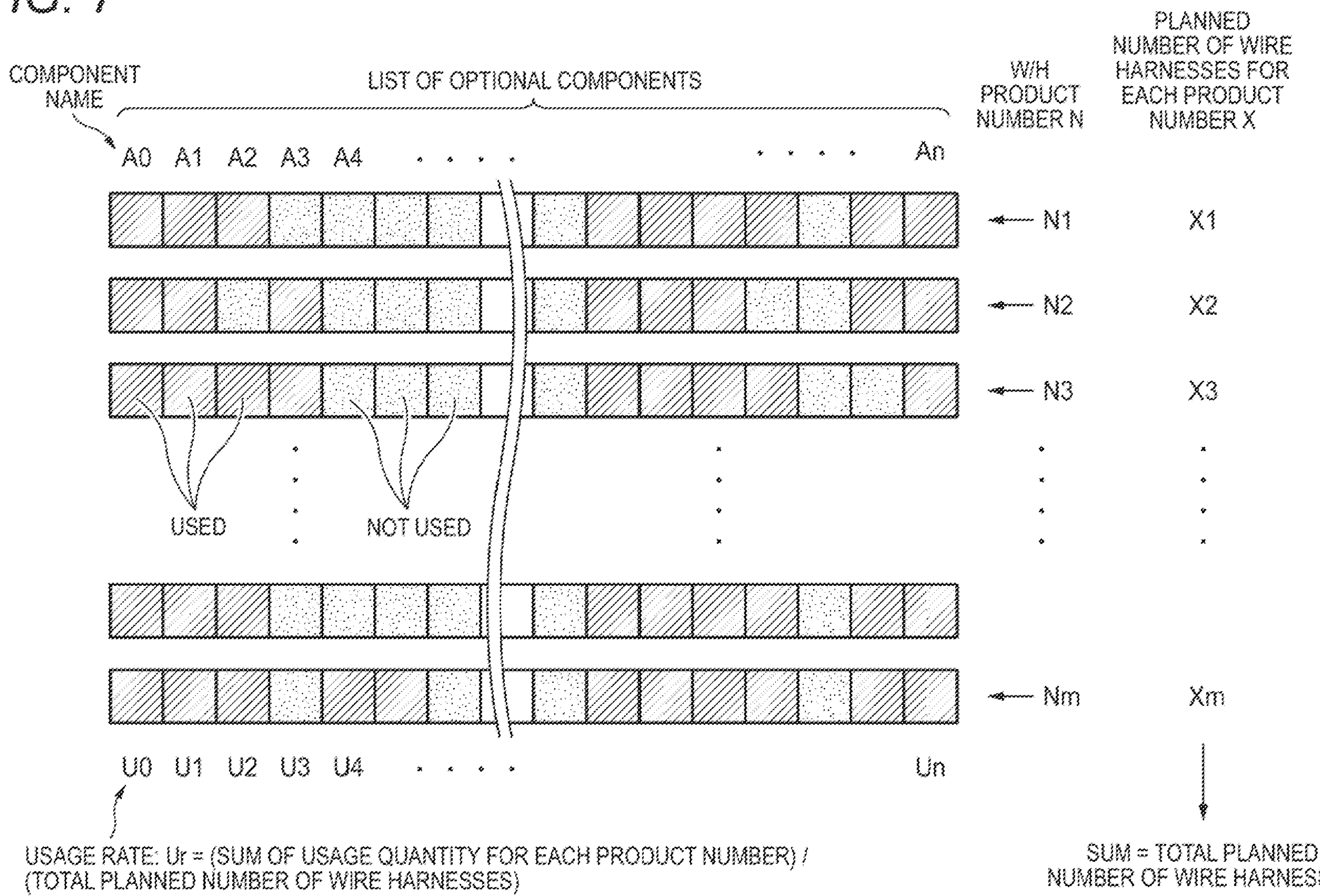
FIG. 7 is a schematic diagram illustrating an example of a display form of a list of optional components for each wire harness product number.

The design support device displays a list of components for each product number of the wire harness PP on a screen in a tabular format (S36). Here, a specific example of contents to be displayed on the screen is illustrated in FIG. 7. The contents will be described later.

With respect to the contents listed on the screen in S36, the design support device updates the display contents by rearranging items (row units) of each product number in descending order of the predicted production quantity Np for each product number (S37).

The design support device updates the display contents by rearranging each component of the contents listed on the screen in descending order of the usage rate Ur (S38).

Figure 8:
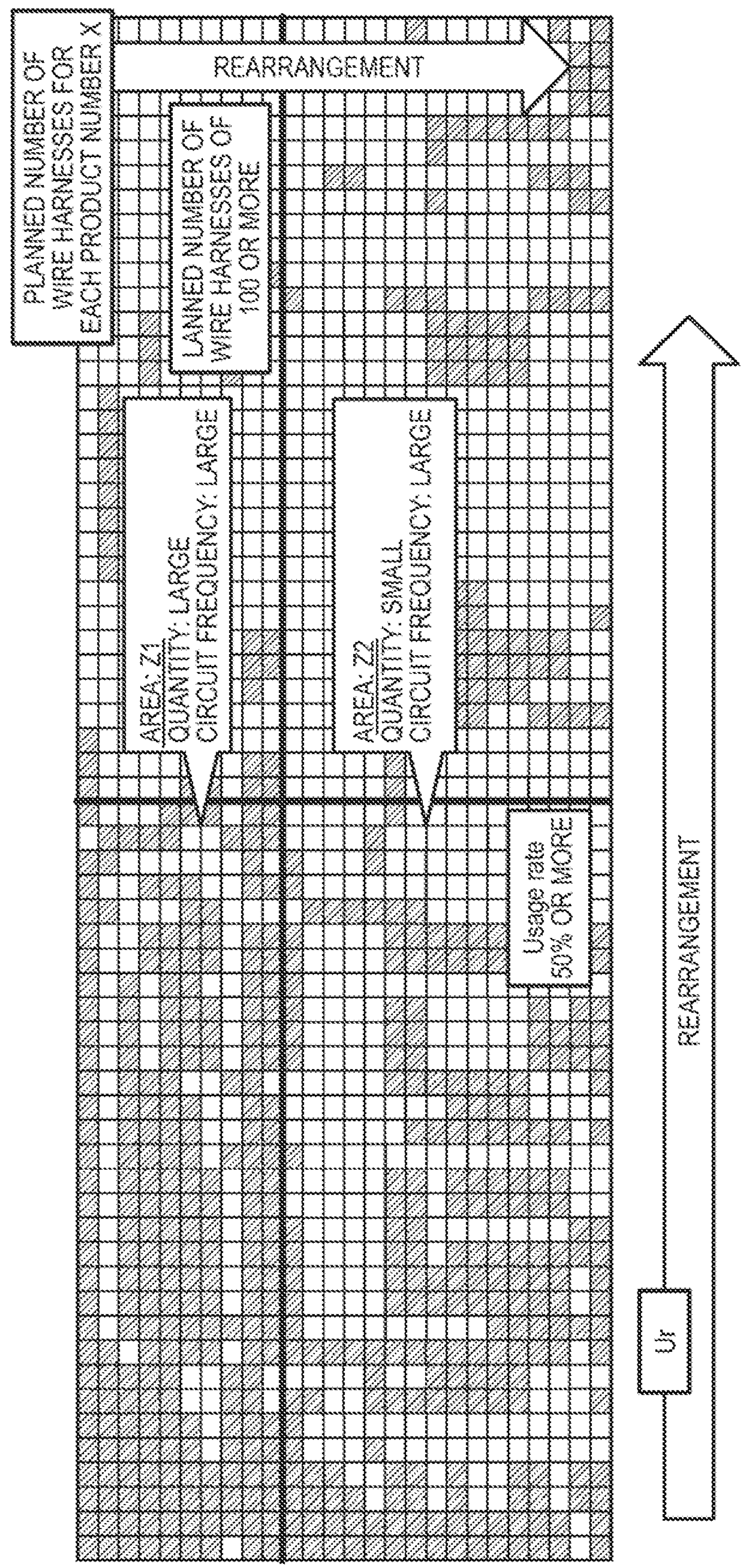
FIG. 8 is a front view illustrating a main part of a screen display example of a list of optional components for each wire harness product number.

FIG. 8 illustrates a specific example of the updated screen after performing step S38. This content will be described later.

The design support device extracts a plurality of secondary common components Pc2 from among a large number of optional components Po displayed on the screen (S39).

The design support device determines the configurations of the sub-harnesses of a plurality of additional parts OB formed of only the secondary common component Pc2 extracted in S39 (S40).

Figure 9:
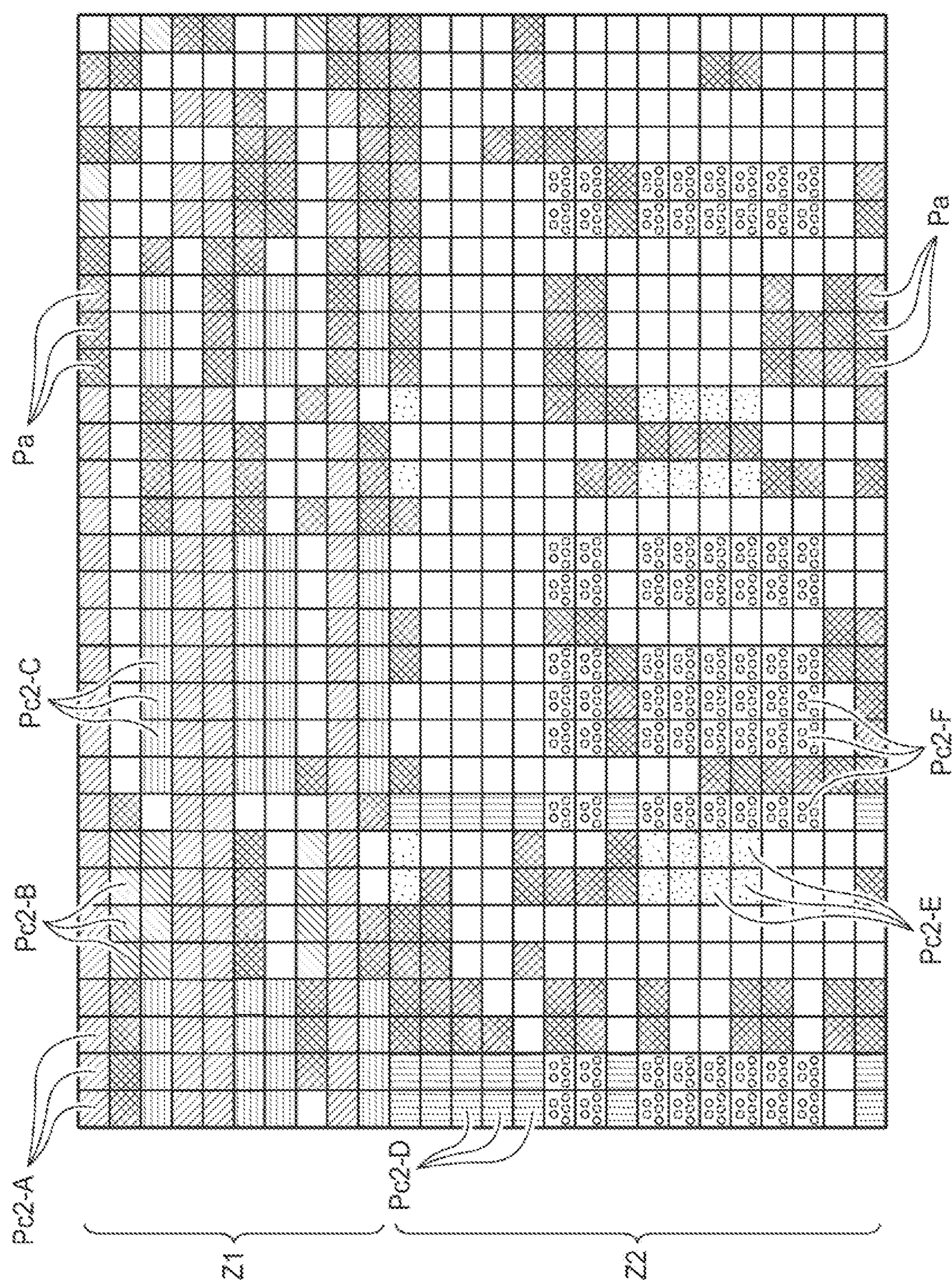
FIG. 9 is a front view illustrating a main part of a screen display example as a result of grouping secondary common components of the optional component.

FIG. 9 illustrates a specific example of the updated screen after performing steps S39 and S40. FIG. 10 illustrates a specific example of a correspondence relationship between the wire harness PP of each product number and the sub-harness of each additional part OB. The contents thereof will be described later.

With respect to the processing of each step S39 and S40, it is assumed that actually, the designer or the like determines whether or not the optional component Po is an appropriate component based on the contents displayed on the screen and selects the secondary common component Pc2, or determines the configuration of each additional part OB, and gives an instruction to the CPU of the design support device by an input operation such as a keyboard to perform the processing. However, it is also possible to automate the determination made by the designer or the like in S39 and S40 with a predetermined program based on some regularity and various conditions.

The design support device respectively classifies each remaining component among the optional components Po, which is not selected for any one of the secondary common components Pc2, as an additional component Pa (S41).

The design support device determines the contents of the second manufacturing specification information D2 (S42) so that as illustrated in FIG. 5B, the configuration of the wire harness PP for each product number is a combination of the sub-harness of the basic part B1, the sub-harness of one or a plurality of additional parts OB, and the additional component Pa.

Display Example of List of Optional Components for Each Product Number

FIG. 7 illustrates an example of a display mode of a list of optional components Po for each product number of the wire harness PP.

In the example of FIG. 7, a list of components (corresponding to individual electric wires or the like) forming each of the wire harness product numbers N1, N2, N3, . . . , Nm to be manufactured is arranged in a horizontal direction in each row. For each product number, a component provided in the corresponding wire harness PP and a component not provided therein are represented by presence or absence of hatching in a rectangular pattern.

For example, in the wire harness PP of the product number N1, each component of component names A1 and A2 is provided, and each component of component names A3 and A4 is not provided. On the other hand, in the wire harness PP of the product number N2, each component of the component names A1 and A3 is provided, and each component of the component names A2 and A4 is not provided. The wire harness PP of each product number also includes a component forming the basic part B1, but in the example of FIG. 7, the component of the basic part B1 is excluded and only the optional component Po is illustrated.

Below each component row, numerical values U1, U2, U3, . . . , Un of the usage rate Ur of the corresponding component (for example, a numerical value of % unit) are illustrated. The usage rate Ur represents a ratio of the total number of used components for each product number to the total planned number of wire harnesses PP. In FIG. 7, values X1, X2, X3, . . . , Xm of the planned number of wire harnesses for each product number X are arranged on the right side of each wire harness product number N. The sum of the planned number of wire harnesses for each product number X is the total planned number of wire harnesses PP.

In step S36 illustrated in FIG. 6, a list of optional components Po as illustrated in FIG. 7 can be displayed on the screen in the tabular format. In addition to the optional component Po, a list of each primary common component Pc1 provided in the basic part B1 may be displayed on the same screen at the same time.

Therefore, a user such as a designer who operates the design support device can easily grasp a configuration of components for each wire harness product number N with reference to the screen as illustrated in FIG. 7. The product number N, the usage rate Ur for each component, the planned number of wire harnesses for each product number X, and the like can be grasped.

Screen Display Example of a List of Optional Components for Each Product Number: After Rearrangement FIG. 8 illustrates a screen display example of a list of optional components of the wire harness PP for each product number. FIG. 8 illustrates a main part on the screen.

From a state of a list of the optional components Po as illustrated in FIG. 7, the design support device rearranges the items in each row from top to bottom in order by row according to the descending order of the predicted production quantity Np for each product number of the wire harness PP (S37 in FIG. 6). The design support device also rearranges the columns of each optional component Po from a left column to a right column in order by column according to the descending order of the usage rate Ur for each component (S38 in FIG. 6). As a result, the screen as illustrated in FIG. 8 can be displayed.

In FIG. 8, use or non-use of each component for each product number is represented by presence or absence of hatching in each small rectangular pattern.

In FIG. 8, a range of component areas Z1 and Z2 is displayed. The component area Z1 represents a range of a component group whose usage rate Ur for each component is high (for example, a threshold value is 50% or more) among the optional components Po forming the wire harness PP of the product number whose planned number of wire harnesses for each product number X is large (for example, a threshold value is 100 units or more), and is displayed in a state of being distinguished from others as a rectangular range on an upper left side of the screen.

The component area Z2 represents a range of a component group whose usage rate Ur for each component is large (for example, the threshold value is 50% or more) among the optional component Po forming the wire harness PP of the product number whose planned number of wire harnesses for each product number X is smaller than that of Z1 (for example, the threshold value is less than 100 units), and is displayed in a state of being distinguished from others as a rectangular range on a lower left side of the screen.

That is, since a large number of blocks of optional components Po are formed within the range of the component areas Z1 and Z2 as illustrated in FIG. 8, it is possible to perform a design which is convenient for manufacturing the wire harness PP of each product number by devising a configuration of a portion of the blocks. Specifically, when the sub-harness of the additional part OB, which is a collection of the components common to the wire harnesses PP of a plurality of product numbers among the optional components Po, is configured as a common intermediate component, the number of components of the wire harness PP including the intermediate component can be significantly reduced. At the same time, since the common intermediate component can be used as any component of the wire harness PP of a plurality of product numbers, the common intermediate component can be useful for adjusting an increase or decrease in the number of wire harnesses PP to be produced for each product number. The common intermediate component can also be useful for making it possible to manufacture the required number of wire harnesses PP for each product number in a short delivery date.

Screen Display Example as a Result of Grouping Secondary Common Components

FIG. 9 illustrates a screen display example as a result of grouping the secondary common components Pc2 of the optional component Po. FIG. 9 illustrates a main part on the screen.

In FIG. 9, in the component area Z1 described above, each optional component Po is displayed in a state of being divided into a set of secondary common components Pc2-A, Pc2-B, and Pc2-C divided into three types of groups, and the remaining additional components Pa. On an actual screen that can be viewed by the eyes of the designer, a difference between respective groups of the secondary common components Pc2-A, Pc2-B, and Pc2-C, and a difference from the remaining additional components Pa are displayed as a difference in coloring of a rectangular display pattern.

Here, for example, a set of 23 pieces of respective secondary common components Pc2-A in the 1st to 20th columns and the 25th, 26th, and 28th columns on the left side provided in the wire harness of the product number in the 1st row in FIG. 9 is also provided in the wire harnesses of other product numbers in the 4th, 5th, and 9th rows in the same manner. Therefore, the set of 23 pieces of secondary common components Pc2-A is grouped into one, and allocated as a component that forms the sub-harness of one additional part OB.

Each additional component Pa provided in the wire harness of the product number in the 1st row is allocated to a remaining component obtained by excluding all the secondary common components Pc2-A from among the optional components Po forming the wire harness of this product number.

In the same manner, a set of 5 pieces of respective secondary common components Pc2-B in the 5th to 8th columns and the 30th column provided in the wire harness of the product number in the 2nd row in FIG. 9 is also provided in the wire harnesses of other product numbers in the 3rd and 8th rows in the same manner. Therefore, the set of 5 pieces of secondary common components Pc2-B is grouped into one, and allocated as a component that forms the sub-harness of one additional part OB.

Each additional component Pa provided in the wire harness of the product number in the 2nd row is allocated to a remaining component obtained by excluding the secondary common components Pc2-B from among the optional components Po forming the wire harness of this product number.

In FIG. 9, in the above-described component area Z2, each optional component Po is displayed in a state of being divided into a set of secondary common components Pc2-D, Pc2-E, and Pc2-F divided into three types of groups, and the remaining additional components Pa. On the actual screen, a difference between respective groups of the secondary common components Pc2-D, Pc2-E, and Pc2-F, and a difference from the remaining additional components Pa are displayed as a difference in coloring of a rectangular display pattern.

Here, for example, a set of 3 pieces of respective secondary common components Pc2-D in the 1st, 2nd, and 9th columns on the left side provided in the wire harness of the product number in the 1st row in the area Z2 in FIG. 9 is also provided in the wire harnesses of other product numbers in the 2nd to 5th rows and the 8th and 16th rows in the same manner. Therefore, the set of 3 pieces of secondary common components Pc2-D is grouped into one, and allocated as a sub-harness component of one additional part OB.

In FIG. 9, a set of 4 pieces of respective secondary common components Pc2-E in the 7th, 8th, 18th, and 20th rows in the area Z2 is also provided in the wire harnesses of other product numbers in the 9th to 12th rows. Therefore, the set of 4 pieces of secondary common components Pc2-E is grouped into one, and allocated as a sub-harness component of one additional part OB.

Each additional component Pa provided in the wire harness of the product number of the 1st row in the component area Z2 is allocated to a remaining component obtained by excluding the secondary common components Pc2-D and Pc2-E from among the optional components Po forming the wire harness of this product number.

That is, as illustrated in FIG. 9, by extracting the secondary common component Pc2 commonly provided in the wire harnesses PP of a plurality of product numbers and performing more appropriate grouping, the configuration of each sub-harness of the plurality of additional parts OB can be determined. By performing the appropriate grouping, the number of components of the wire harness PP for each product number (the intermediate component is counted as one component) can be reduced, such that it becomes also easy to perform adjustment with respect to a fluctuation in the number of wire harnesses PP required for each product number.

The work of extracting and grouping the secondary common components Pc as illustrated in FIG. 9 may be actually determined by the judgment of the designer, or may be automatically processed by a program.

Display Example of Additional Part Configuration, Number of Additional Components, Total Number of Components, or the Like FIG. 10 illustrates a display example of an additional part configuration, the number of additional components, the total number of components, or the like for each product number of the wire harness PP.

In the example of FIG. 10, a combination of the additional parts OB-A to OB-F formed of the secondary common components Pc2-A to Pc2-F of the six groups illustrated in FIG. 9, the additional number of additional components Pa, and the total number of components NT are displayed in a list for each product number of the wire harness PP.

In FIG. 10, for example, the wire harness PP of the product number (B111) shown in the 1st row is formed of the sub-harness of one additional part OB-A and 10 pieces of additional components Pa, such that the total number of components NT is 11 (1+10). Actually, this optional component and the basic part B1 are combined to form the wire harness PP of one product number.

For example, the wire harness PP of the product number (Z423) shown in the 3rd row is formed of the sub-harnesses of two types of additional parts OB-B and OB-C and 11 pieces of additional components Pa, such that the total number of components NT is 13 (2+11).

Each additional component Pa is a small-scale component formed of about one to several electric wires. The number of electric wires provided in each of the additional parts OB-A to OB-F is about several to several tens. As illustrated in FIG. 10, by appropriately grouping respective secondary common components Pc2 forming respective additional parts OB-A to OB-F, the number of additional components forming the whole wire harness PP can be reduced by, for example, about half.

That is, since the configuration of the basic part B1 is irrelevant to the product number, the manufacturing of the basic part B1 can be started at a stage where the planned production quantity of the whole vehicle is almost confirmed, even before the number of wire harnesses PP for each product number required by the customer is confirmed. Since the configurations of the respective additional parts OB-A to OB-F are common to a plurality of product numbers, the additional parts OB-A to OB-F having the common configuration can be flexibly adjusted among the plurality of product numbers, with respect to the increase or decrease in the required number of wire harnesses PP for each product number. Therefore, the manufacturing of the sub-harnesses of the respective additional parts OB-A to OB-F can also be started before the production quantity for each product number is confirmed.

The manufacturing of the sub-harness of the basic part B1 which is a component of the wire harness PP can be started at a sufficiently early timing with respect to the delivery date of the wire harness PP to the customer. Therefore, the basic part B1 can be manufactured and transported over a long distance by using a base located far away from the delivery location, such as an overseas production base or the like, and can be used as a component of the wire harness PP. The manufacturing of the sub-harness of each additional part OB can be started by using a base close to the delivery destination, such as a domestic manufacturing base or the like, even before the number of wire harnesses PP for each product number required by the customer is confirmed. The manufacturing of the minimum number of respective additional components Pa may be started before the actual required quantity is confirmed by anticipating the expected fluctuation in the number of wire harnesses PP for each product number required by the customer.

According to the embodiment, a component manufacturing system (100, 100A) can be used by a component manufacturer that manufactures a wire harness, which is a vehicle component, based on a customer requirement.

The component manufacturing system (100, 100A) includes:

a main base (10); and a first production base (20) and a second production base (30) located in different regions from each other, in which the main base has a function of designing a common wire harness (the basic part B1) commonly used for a plurality of vehicle product numbers and a plurality of optional wire harnesses (the optional parts OP) different for each product number (the basic part design function 12, the optional part design function 13) based on plan information from the customer (the first manufacturing specification information D1), the first production base has a function of producing the common wire harness based on an order instruction from the main base (the order reception management server 21, the basic part manufacturing facility 22), the second production base is located closer to a delivery location (the customer's delivery location 42) designated by the customer than the first production base, the second production base has a function of acquiring the common wire harness from the first production base, combining the common wire harness with the optional wire harness based on the order instruction from the main base, and delivering a completed wire harness to the delivery location (the basic part acquisition management part 33, the order reception management server 31, the optional part manufacturing facility 32, the product manufacturing facility 34), and the main base further has a first order function of determining the number of common wire harnesses to be produced based on temporary order information and placing an order with the first production base (the order management server 14, the first order information 10*a*), and a second order function of acquiring order confirmation information (41*b*) from the customer at a timing closer to a delivery date than the temporary order information and placing an order with the second production base for the completed wire harness based on the confirmation information (the order management server 14, the second order information 10*b*).

With the component manufacturing system having the above-described configuration, it is possible to prevent occurrence of excess inventory of the wire harness. That is, the component produced at the first production base can be limited to the common wire harness common to a plurality of product numbers, such that even though the common wire harness is manufactured in advance before the required number of wire harnesses for each product number is confirmed, the generated number of excess common wire harnesses that are not used for the delivery this time can be reduced to the extent of a fluctuation in the number of vehicles. Even though the first production base is located overseas, the second production base is located at a place near the delivery location, such that the time required for transportation from the second production base to the delivery location is shortened, and it becomes easy to deliver the number of completed wire harnesses for each product number required by the customer without any shortage by the delivery date.

The order instruction to the second production base by the second order function of the main base (the second order information 10*b*) may be performed at a timing (after t2) after start of transportation of the common wire harness from the first production base to the second production base (t12).

With the component manufacturing system having the above-described configuration, after the number of common wire harnesses produced at the first production base that can be acquired at the second production base is confirmed, a content of the order instruction to the second production base can be appropriately adjusted according to the number thereof.

The main base may include a main body part (10A) for acquiring the temporary order information and a delivery part (10B) for acquiring the confirmation information, and the second production base may deliver the completed wire harness (the wire harness PP) to the delivery location (the customer's delivery location 42) via the delivery part.

With the component manufacturing system having the above-described configuration, at the main base, the temporary order information and the confirmation information of the information on orders from the customer can be respectively processed at an independent part or as an independent function. Therefore, the main part and the delivery part can concentrate on only the processing of functions respectively allocated thereto, thereby making it possible to avoid complicated processing caused by a mixture of the temporary order information and the confirmation information that are generated at different timings.

The component manufacturing system having the above-described configuration may further include an intermediate base (50) that is provided between the first production base and the second production, inspects the common wire harness received from the first production base, and ships the inspected common wire harness to the second production base.

With the component manufacturing system having the above-described configuration, an inspection function is added to the intermediate base, such that the second production base can acquire only the common wire harness whose predetermined quality is ensured, and complicated processing can be avoided.

The optional wire harness may be produced at the second production base.

With the component manufacturing system having the above-described configuration, since the optional wire harness is produced at the second production base where the common wire harness and the optional wire harness are combined with each other, it is not required to transport the optional wire harness from another base to the second production base, such that a time margin from the acquisition of the confirmation information from the customer to the production of the completed wire harness is further increased.

According to the embodiment, a component manufacturing method can be used by a component manufacturer that manufactures a wire harness, which is a vehicle component, based on a customer requirement.

The component manufacturing method uses a main base, and a first production base and a second production base located in different regions from each other, provides a function, by the main base, of designing a common wire harness (the basic part B1) commonly used for a plurality of vehicle product numbers and a plurality of optional wire harnesses (the optional parts OP) different for each product number based on plan information (the first manufacturing specification information D1) from the customer, provides a function, by the first production base, of producing the common wire harness based on an order instruction from the main base, arranges the second production base to be located closer to a delivery location designated by the customer than the first production base, and provides a function, by the second production base, of acquiring the common wire harness from the first production base, producing the optional wire harness (the optional part OP) based on the order instruction from the main base, combining the common wire harness with the optional wire harness (the optional part OP), and delivering a completed wire harness to the delivery location, in which the main base includes:

a first order step of determining the number of common wire harnesses to be produced based on temporary order information and placing an order with the first production base (S12, S13);

a transportation step of transporting the common wire harness produced by the first production base to the second production base (S15); and a second order step of acquiring order confirmation information from the customer at a timing closer to a delivery date than the temporary order information and placing an order with the second production base for the completed wire harness based on the confirmation information (S22).

With the component manufacturing method having the above-described configuration, it is possible to prevent occurrence of excess inventory of the wire harness. That is, the component produced at the first production base can be limited to the common wire harness common to a plurality of product numbers, such that even though the common wire harness is manufactured in advance before the required number of wire harnesses for each product number is confirmed, the generated number of excess common wire harnesses that are not used for the delivery this time can be reduced to the extent of a fluctuation in the number of vehicles. Even though the first production base is located overseas, the second production base is located at a place near the delivery location, such that the time required for transportation from the second production base to the delivery location is shortened, and it becomes easy to deliver the number of completed wire harnesses for each product number required by the customer without any shortage by the delivery date.

According to the embodiment, a component manufacturing system manufactures a wire harness, which is a vehicle component, at a main base and at a first production base and a second production base located in different regions from each other.

The main base includes:

a function of designing a common wire harness (the basic part B1) commonly used for a plurality of vehicle product numbers and a plurality of optional wire harnesses (the optional parts OP) different for each product number based on plan information (the first manufacturing specification information D1) from a customer (the basic part design function 12, the optional part design function 13);

a function of transmitting design information for producing the common wire harness to the first production base (the order management server 14);

a first order function of determining the number of common wire harnesses to be produced based on temporary order information and placing an order with the first production base (the order management server 14, the first order information 10*a*);

a function of transmitting design information for producing a completed wire harness by combining the common wire harness and the optional wire harness to the second production base (the order management server 14); and a second order function of acquiring order confirmation information from the customer at a timing closer to a delivery date than the temporary order information and placing an order with the second production base for the completed wire harness based on the confirmation information (the order management server 14, the second order information 10*b*).

With the component manufacturing system having the above-described configuration, it is possible to prevent occurrence of excess inventory of the wire harness. That is, the component produced at the first production base can be limited to the common wire harness common to a plurality of product numbers, such that even though the common wire harness is manufactured in advance before the required number of wire harnesses for each product number is confirmed, the generated number of excess common wire harnesses that are not used for the delivery this time can be reduced to the extent of a fluctuation in the number of vehicles. Even though the first production base is located overseas, the second production base is located at a place near the delivery location, such that the time required for transportation from the second production base to the delivery location is shortened, and it becomes easy to deliver the number of completed wire harnesses for each product number required by the customer without any shortage by the delivery date.

With the component manufacturing system and the component manufacturing method of the embodiment, even when the common wire harness for a large number of product numbers is produced overseas and imported therefrom, occurrence of excess inventory of the wire harness can be prevented, and it becomes easy for the component manufacturer to deliver the number of wire harnesses required by the customer without any shortage by the delivery date.

What is claimed is:

1. A component manufacturing system that can be used by a component manufacturer that manufactures a wire harness, which is a vehicle component, based on a customer requirement, the system comprising:

a main base; and a first production base and a second production base located in different regions from each other, wherein the main base has a function of designing a common wire harness commonly used for a plurality of vehicle product numbers and a plurality of optional wire harnesses different for each product number based on plan information from the customer, the first production base produces the common wire harness based on an order instruction from the main base, the second production base is located closer to a delivery location designated by the customer than the first production base, the second production base acquires the common wire harness from the first production base, combines the common wire harness with the optional wire harness based on the order instruction from the main base, and delivers a completed wire harness to the delivery location, and the main base has a first order function of determining the number of common wire harnesses to be produced based on temporary order information and placing an order with the first production base, a second order function of acquiring order confirmation information from the customer at a timing closer to a delivery date than the temporary order information and placing an order with the second production base for the completed wire harness based on the confirmation information, placing the order to the second production base by the second order function of the main base is performed at a timing after the main base has determined a start of transportation of the common wire harness from the first production base to the second production base.

2. The component manufacturing system according to claim 1, wherein the main base includes a main body part for acquiring the temporary order information and a delivery part for acquiring the confirmation information, and the second production base delivers the completed wire harness to the delivery location via the delivery part.

3. The component manufacturing system according to claim 1, further comprising an intermediate base that is provided between the first production base and the second production base, inspects the common wire harness received from the first production base, and ships the inspected common wire harness to the second production base.

4. The component manufacturing system according to claim 1, wherein the optional wire harness is produced at the second production base.

5. A component manufacturing method that can be used by a component manufacturer that manufactures a wire harness, which is a vehicle component, based on a customer requirement, the method comprising:

using a main base, and a first production base and a second production base located in different regions from each other;

providing a function, by the main base, of designing a common wire harness commonly used for a plurality of vehicle product numbers and a plurality of optional wire harnesses different for each product number based on plan information from the customer;

producing, by the first production base, the common wire harness based on an order instruction from the main base, arranging the second production base to be located closer to a delivery location designated by the customer than the first production base; and acquiring, by the second production base, the common wire harness from the first production base, combining the common wire harness with the optional wire harness based on the order instruction from the main base, and delivering a completed wire harness to the delivery location, wherein the main base includes a first order step of determining the number of common wire harnesses to be produced based on temporary order information and placing an order with the first production base, a transportation step of transporting the common wire harness produced by the first production base to the second production base, a second order step of acquiring order confirmation information from the customer at a timing closer to a delivery date than the temporary order information and placing an order with the second production base for the completed wire harness based on the confirmation information, placing the order to the second production base by the second order function of the main base is performed at a timing after the main base determines a start of transportation of the common wire harness from the first production base to the second production base.

6. The component manufacturing system according to claim 1, wherein the main base generates a display illustrating ones of the components of the wire harness and the optional wire harnesses in different manners according to determining ratios between usage quantities of ones of the components and the number of common wire harnesses, and controlling a screen to output the display.

* * * * *